(12) United States Patent
Peebler et al.

(10) Patent No.: US 12,646,264 B2
(45) Date of Patent: Jun. 2, 2026

(54) VIRTUAL INDICATOR FOR CAPTURING A SEQUENCE OF IMAGES

(71) Applicant: Apple Inc., Cupertino, CA (US)

(72) Inventors: Bradley W. Peebler, Redwood City, CA (US); Zachary Z. Becker, Issaquah, WA (US); Qiujie Wu, Pittsburgh, PA (US); Shem Nguyen, Oakland, CA (US); Sneha S. Bhakare, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 53 days.

(21) Appl. No.: 18/204,072

(22) Filed: May 31, 2023

(65) Prior Publication Data

US 2023/0396874 A1 Dec. 7, 2023

Related U.S. Application Data

(60) Provisional application No. 63/440,667, filed on Jan. 23, 2023, provisional application No. 63/347,720, filed on Jun. 1, 2022.

(51) Int. Cl.
| | |
|---|---|
| *G06T 19/00* | (2011.01) |
| *H04N 23/60* | (2023.01) |
| *H04N 23/63* | (2023.01) |

(52) U.S. Cl.
CPC ......... *G06T 19/006* (2013.01); *H04N 23/631* (2023.01); *H04N 23/635* (2023.01); *H04N 23/64* (2023.01)

(58) Field of Classification Search
CPC .............. G06T 19/006; G06T 2200/24; G06T 2219/024; H04N 23/631; H04N 23/635; H04N 23/64; H04N 23/633
See application file for complete search history.

(56) References Cited

U.S. PATENT DOCUMENTS

| | | | | |
|---|---|---|---|---|
| 2013/0100306 A1* | 4/2013 | Bekiares | .............. | H04N 23/661 |
| | | | | 348/E5.043 |
| 2021/0312702 A1* | 10/2021 | Holzer | ...................... | G06T 3/00 |

\* cited by examiner

*Primary Examiner* — Yogesh K Aggarwal
(74) *Attorney, Agent, or Firm* — Fernando & Partners, LLP

(57) ABSTRACT

A first device includes a display, an input device, a non-transitory memory and one or more processors coupled with the display, the input device and the non-transitory memory. In some implementations, a method includes detecting, via the input device, an input that corresponds to a request to generate a path for an entity to follow while a sequence of images is to be captured. In some implementations, the method includes generating the path for the entity based on the request. In some implementations, the method includes triggering a second device that is associated with the entity to overlay a virtual indicator indicative of the path on a pass-through of a physical environment. In some implementations, the virtual indicator guides the entity along the path while the sequence of images is captured.

19 Claims, 23 Drawing Sheets

300

400

500

510

520

Input 524
(e.g., cinematic
shot selection,
hand-drawn path)

522

Path
indication
526

Virtual
indicator 528

532

534

530

700

800

CPU(s)
801

Network
Interface
802

805

I/O device(s)
810

Programming
Interface
803

Memory 804

Operating System 806

Input obtainer 610

Instructions 610a

Heuristics & Metadata 610b

Path generator 620

Instructions 620a

Heuristics & Metadata 620b

Path communicator 630

Instructions 630a

Heuristics & Metadata 630b

900

Obtain an indication of a path to follow while a sequence of images is to be captured by the image sensor — 910

Display a virtual indicator of the path that is overlaid onto a pass-through of a physical environment — 920

Capture the sequence of images as the device moves along the path indicated by the virtual indicator — 930

VIRTUAL INDICATOR FOR CAPTURING A SEQUENCE OF IMAGES

CROSS-REFERENCE TO RELATED APPLICATIONS

This application claims the benefit of U.S. Provisional Patent App. No. 63/347,720, filed on Jun. 1, 2022, and U.S. Provisional Patent App. No. 63/440,667, filed on Jan. 23, 2023, which are incorporated by reference in their entirety.

TECHNICAL FIELD

The present disclosure generally relates to a virtual indicator for capturing images.

BACKGROUND

Some devices include a camera for capturing images. Some such devices include a camera application that presents a graphical user interface for controlling certain aspects of the camera. For example, the graphical user interface may include an option to turn a flash on or off while the camera captures images. While cameras of most devices have the ability to capture images of sufficient quality, most graphical user interfaces do not facilitate the capturing of certain cinematic shots.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1B:
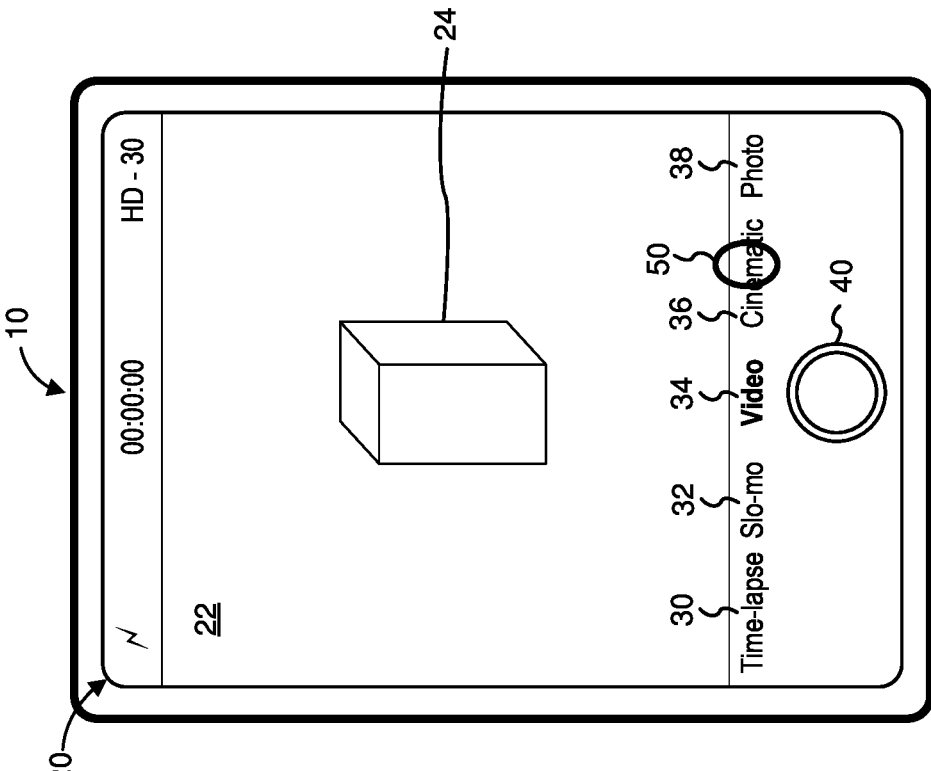
FIGS. 1A-1O are diagrams of an example camera user interface in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying a virtual indicator that guides a user in capturing certain cinematic shots. In some implementations, a device includes a display, an environmental sensor, a non-transitory memory, and one or more processors coupled with the display, the environmental sensor and the non-transitory memory. In various implementations, a method includes obtaining a request to capture a sequence of images depicting a subject. The sequence of images is to be captured while an image sensor is being moved along a path with a predefined shape. The method includes determining a dimension of the path. The method includes overlaying, on a pass-through of the physical environment, a virtual indicator that indicates the path with the dimension and the predefined shape. The virtual indicator guides a user of the device along the path while capturing the sequence of the images with the image sensor.

Various implementations disclosed herein include devices, systems, and methods for allowing a first device to generate a path for an entity to follow while a sequence of images is captured. In some implementations, the first device includes a display, an input device, a non-transitory memory and one or more processors coupled with the display, the input device and the non-transitory memory. In some implementations, a method includes detecting, via the input device, an input that corresponds to a request to generate a path for an entity to follow while a sequence of images is to be captured. In some implementations, the method includes generating the path for the entity based on the request. In some implementations, the method includes triggering a second device that is associated with the entity to overlay a virtual indicator indicative of the path on a pass-through of a physical environment. In some implementations, the virtual indicator guides the entity along the path while the sequence of images is captured.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Capturing certain types of images and/or videos may require a user to move a camera-enabled device along a specific path. For example, performing a full rotation around a subject may require the user to walk around the subject along a circular path. Since the circular path may not be marked, it is unlikely that the user's actual path will be circular. For example, the user's actual path may be oval or some other shape that is not circular. As such, the resulting video may not capture the subject equidistantly from all angles because some points of view may be closer to the subject than other points of view.

The present disclosure provides methods, systems, and/or devices for displaying a virtual indicator that guides the user in capturing certain types of cinematic shots. While presenting a pass-through of a physical environment, the device overlays a virtual indicator on the pass-through to indicate a path for the user to traverse while capturing a set of images. For example, if the user wants to capture a 360° video of the subject, the device can overlay a virtual circle that surrounds the subject. In this example, the user can walk along the virtual circle while pointing the camera towards the subject in order to capture images of the subject from all angles.

The user can specify the path by walking along a user-curated path and allowing an environmental sensor of the device to record the user-curated path. For example, the user can select an option to define a path and the device can capture images, depth data and/or IMU data as the user walks while holding the device. After capturing the images, the depth data and/or the IMU data, the device can display a virtual indicator that guides the user or another person to walk along the path that the user defined. The user can specify a distance for a path and the device can determine the path based on the distance that the user specified. For example, the user can specify a value for a radius of a circle and the device can determine a circular path based on the value that the user specified.

While the user is walking along the path, the device can indicate a target speed for the user to walk along the path. The device can indicate the target speed by displaying text on a screen (e.g., "slow down", "speed up", etc.). Alternatively, the device can indicate the target speed by changing a color of the virtual path (e.g., green for speeding up and yellow for slowing down).

As the user walks along the path indicated by the virtual indicator, the user may veer off the path from time-to-time. For example, the user may not be able to walk all along a circular path. As such, some of the images captured by the device may be from points of view that are not on the path. Additionally, the user may not walk along the path at a consistent speed. For example, the user may walk relatively fast through a portion of the path and relatively slow through another portion of the path. The device can warp some of the images captured while the user was moving along the path in order to compensate for the user veering off the path or for the user moving at an irregular speed. Warping the images can compensate for irregular movement of the user and the camera along the path.

The device can synthesize new views based on existing views if the captured images do not include images from certain views. As the user walks along the path, the user may not have captured images from all segments of the path. As such, there may be certain segments of the path for which the device does not have any images. The device can use images captured from other segments of the path to synthesize a view from the missing segment. The device can utilize methods and/or systems associated with novel view synthesis to synthesize the view from the missing segment of the path. Novel view synthesis can be used for spatial warping in order to compensate for unintended movement of the device away from the path.

The user can select a path after capturing images and the device can present previously-captured images that were captured along the path. For example, the user may be walking around a museum and capturing images from various points of view. Later, the user can draw a path that encircles a statue and the device can use the existing images to generate a 360° video (hereafter "360 degree video") of the statue. The device may employ methods and/or systems associated with novel view synthesis to generate views that may not exist.

Figure 1A:
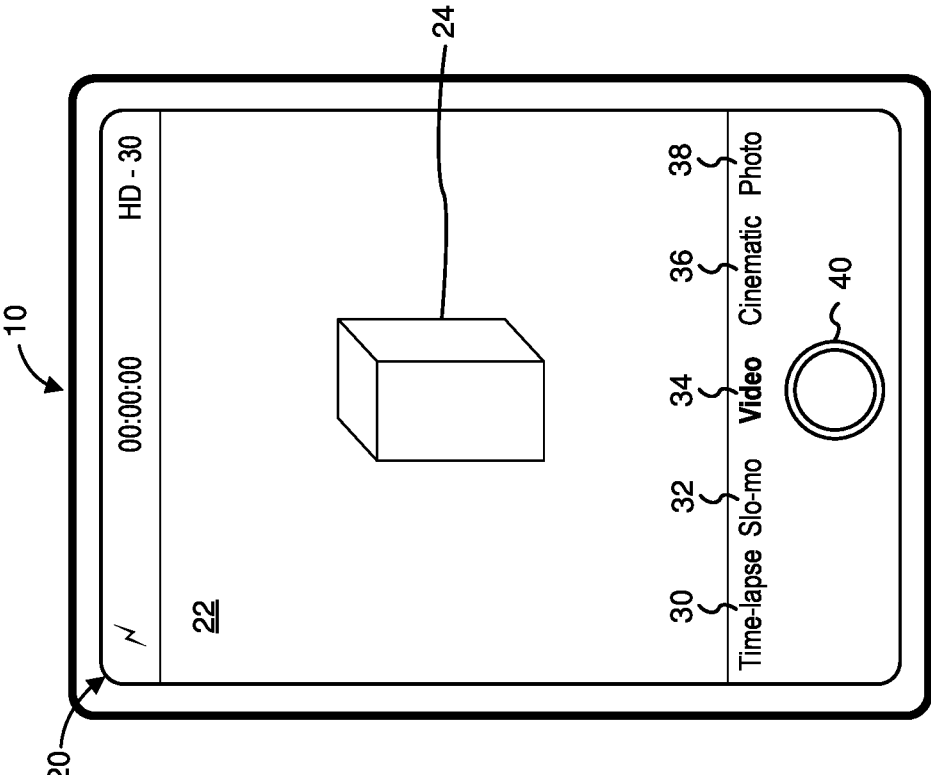

FIG. 1A is a diagram that illustrates an example electronic device 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the electronic device 10 includes a handheld computing device that can be held by a user (not shown). For example, in some implementations, the electronic device 10 includes a smartphone, a tablet, a media player, a laptop, or the like. In some implementations, the electronic device 10 includes a wearable computing device that can be worn by the user. For example, in some implementations, the electronic device 10 includes a head-mountable device (HMD) or an electronic watch.

In various implementations, the electronic device 10 includes a display and a camera application for controlling a camera. In some implementations, the electronic device 10 includes the camera (e.g., the camera is integrated into the electronic device 10). Alternatively, in some implementations, the camera is separate from the electronic device 10 and the electronic device 10 controls the camera via a control channel (e.g., a wireless control channel, for example, via short-range wireless communication).

In various implementations, the camera application generates and presents a camera interface 20 for controlling the camera. The camera interface 20 includes a preview 22 of an image that can be captured by pressing a capture affordance 40. The preview 22 includes two-dimensional (2D) representations of physical articles that are in a field-of-view of the camera. In the example of FIG. 1A, the preview 22 includes a 2D representation 24 of a subject (hereafter "subject 24"). The subject 24 may be a physical article such as a monument, a statue, a natural or manmade landmark, a person, etc. In some implementations, the preview 22 is referred to as a pass-through of a physical environment of the electronic device 10. If the electronic device 10 includes an opaque display, the preview 22 may be referred to as a video pass-through of the physical environment. If the electronic device 10 includes an optical see-through display, the preview 22 may be referred to as an optical see-through of the physical environment.

The camera interface 20 includes affordances for capturing different types of images and videos of the subject 24. In the example of FIG. 1A, the camera interface 20 includes a time-lapse shot affordance 30 for capturing a time-lapse video of the subject 24, a slow motion shot affordance 32 for capturing a slow motion video of the subject 24, a video shot affordance 34 for capturing a video of the subject 24, a cinematic shot affordance 36 for capturing a cinematic shot of the subject 24, and a photo shot affordance 38 for capturing a single shot (e.g., a still image) of the subject 24.

In various implementations, a cinematic shot of the subject 24 refers to a video that is captured while the electronic device 10 is being moved along a path with a predefined shape. In other words, capturing a cinematic shot of the subject 24 includes concurrently recording a video of the subject 24 and moving the electronic device 10 along a path with a predefined shape. For example, as shown in FIGS. 1E-1J, capturing a 360 degree video shot of the subject 24 includes concurrently recording a video of the subject 24 and moving the electronic device 10 along a circular path. As another example, as shown in FIG. 1K, capturing a push shot of the subject 24 includes concurrently recording a video of the subject 24 and moving the electronic device 10 along a straight path towards the subject 24. As another example, as shown in FIG. 1L, capturing a pull shot of the subject 24 includes concurrently recording a video of the subject 24 and moving the electronic device 10 along a straight path away from the subject 24. As another example, as shown in FIG. 1M, capturing a tracking shot of the subject 24 includes concurrently recording a video of the subject 24 and moving the electronic device 10 along a path that is parallel to a current trajectory of the subject 24. As yet another example, as shown in FIG. 1N, capturing a zig-zag shot of the subject 24 includes concurrently recording a video of the subject 24 and moving the electronic device 10 along a zig-zag path. As a further example, as shown in FIG. 1O, capturing a spiral shot of the subject 24 includes concurrently recording a video of the subject 24 and moving the electronic device 10 along a spiral path.

Referring to FIG. 1B, the electronic device 10 detects a user input 50 directed to the cinematic shot affordance 36. The user input 50 corresponds to a request to capture a cinematic shot of the subject. As described herein, in various implementations, a cinematic shot refers to a video that is captured while the electronic device 10 is moving along a path with a predefined shape. Referring to FIG. 1C, in response to detecting the selection of the cinematic shot affordance 36, the electronic device 10 provides the user an option to select a particular type of cinematic shot from various different types of cinematic shots.

In the example of FIG. 1C, the electronic device 10 displays a 360 degree shot affordance 60 for capturing a 360 degree video, a push shot affordance 62 for capturing a push shot, a pull shot affordance 64 for capturing a pull shot, a tracking shot affordance 66 for capturing a tracking shot, a spiral shot affordance 68 for capturing a spiral shot and a zig-zag shot affordance for capturing a zig-zag shot.

Figure 1D:
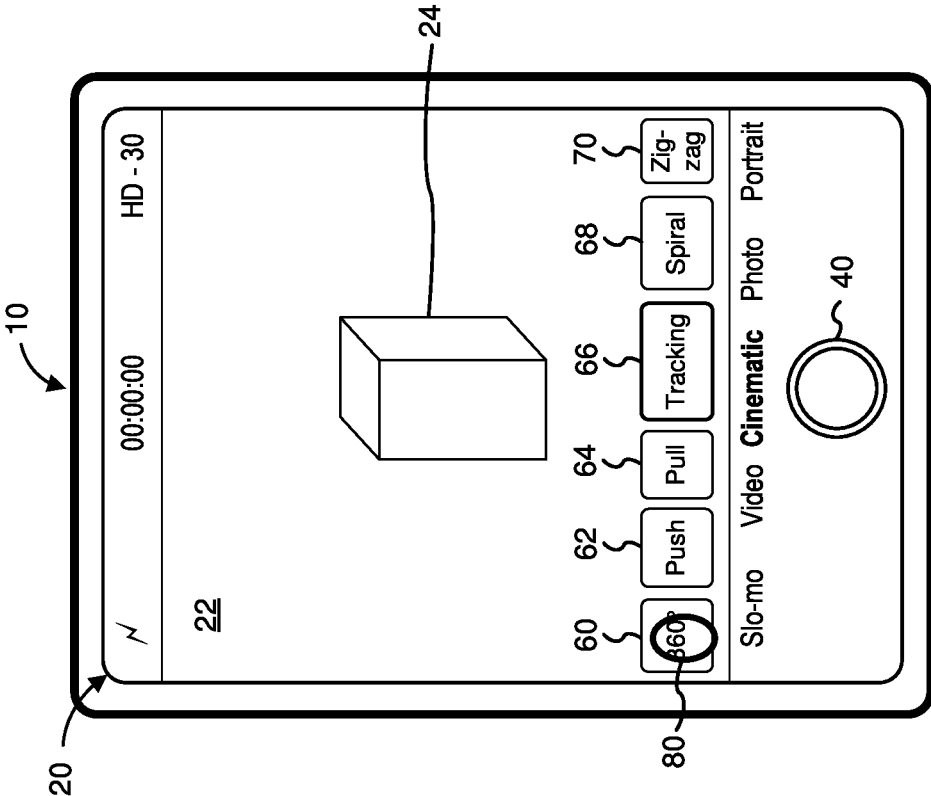
Figure 1C:
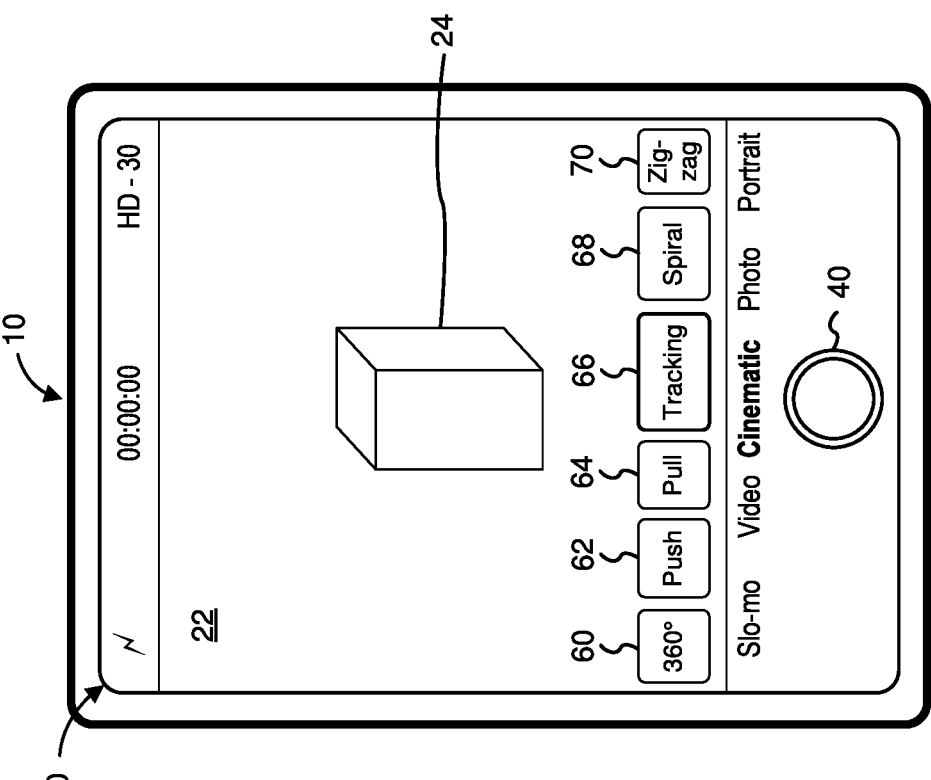
Figure 1F:
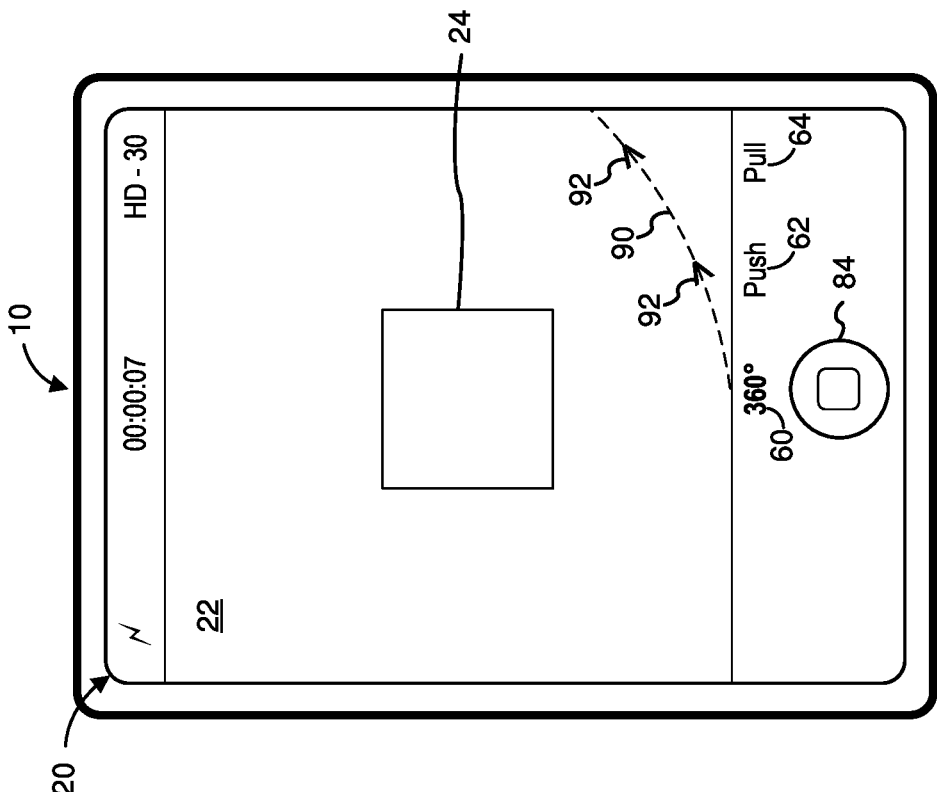
Figure 1E:
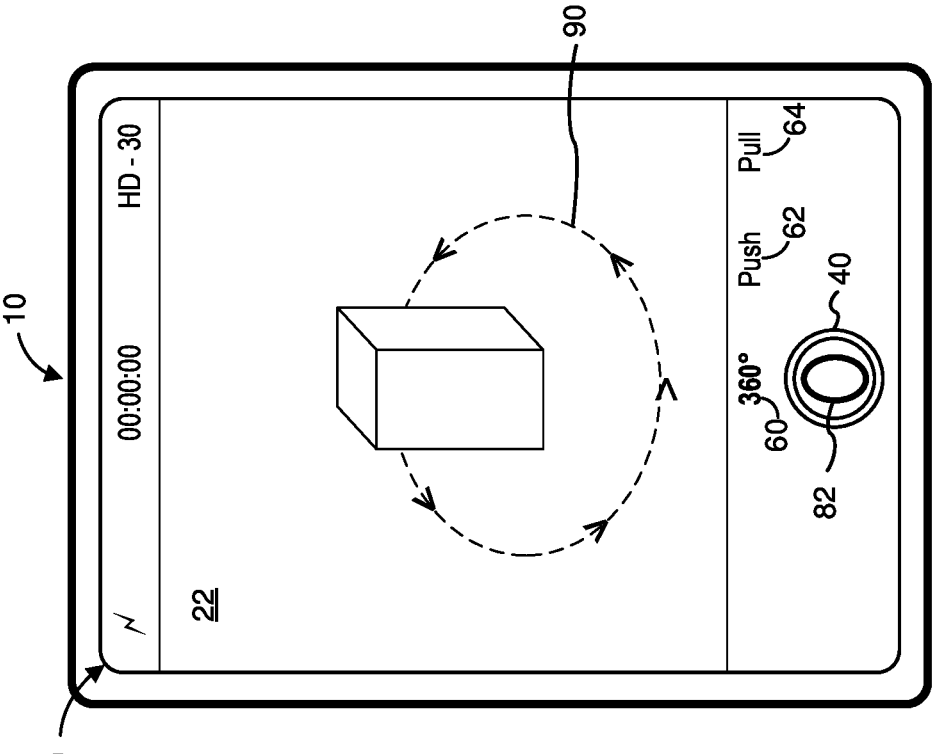
Figure 1H:
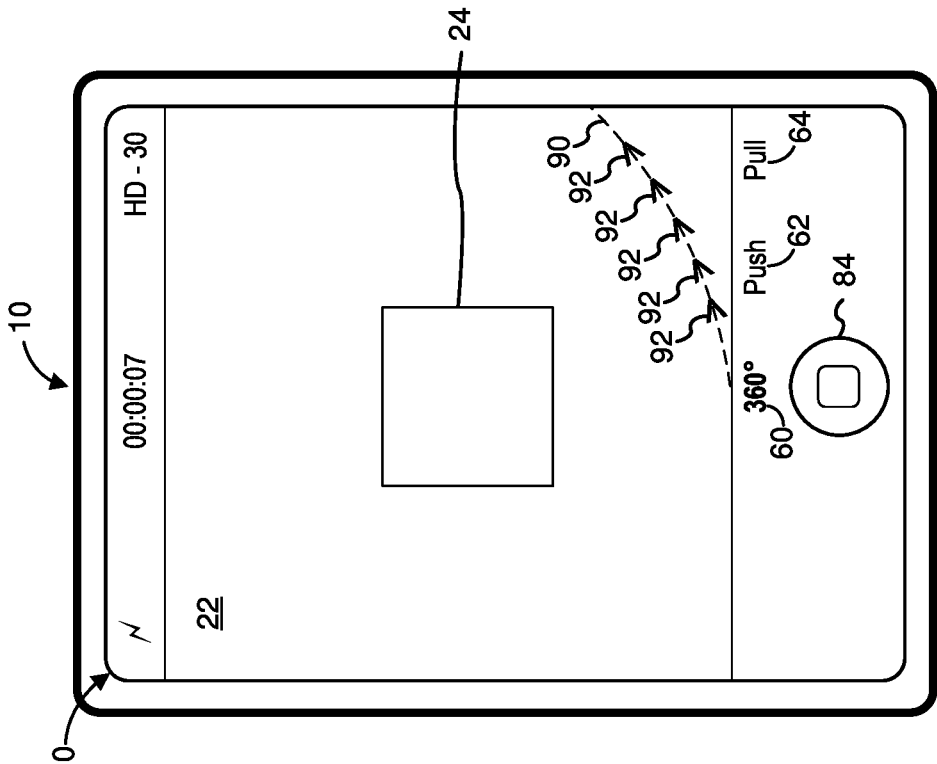

As shown in FIG. 1D, the electronic device 10 detects a user input 80 directed to the 360 degree shot affordance 60. The user input 80 corresponds to a request to capture a 360 degree video of the subject 24. Referring to FIG. 1E, in response to detecting the user input 80 shown in FIG. 1D, the electronic device 10 displays a circular path 90 that encircles the subject 24. Since the preview 22 is a pass-through of the physical environment, displaying the circular path 90 includes overlaying the circular path 90 onto the pass-through of the physical environment. The user of the electronic device 10 can capture a 360 degree video of the subject 24 by walking along the circular path 90 while the electronic device 10 captures a video of the subject 24. The 360 degree shot of the subject 24 is captured by concurrently maintaining the subject 24 in a field-of-view of the camera of the electronic device 10 and moving the electronic device 10 along the circular path 90. Capturing a video of the subject 24 while walking along the circular path 90 results in a 360 degree shot that is within a degree of similarity to a 360 degree shot that is captured by a camera while the camera is being moved on a physical circular track that encircles the subject 24.

The electronic device 10 detects a user input 82 directed to the capture affordance In response to detecting the user input 82, the electronic device 10 starts recording a video. Referring to FIG. 1F, the electronic device 10 is capturing a video of the subject 24 as the user is walking along the circular path 90 and causing the electronic device 10 to move along the circular path 90. In the example of FIG. 1F, the electronic device 10 displays a dashed line to indicate the circular path 90 and directional arrows 92 to indicate a direction for the user of the electronic device 10 to walk towards in order to continue capturing the 360 degree video of the subject 24. While the electronic device 10 is recording the 360 degree video, the electronic device displays a stop capture affordance 84 that the user can select to stop capturing the 360 degree video of the subject 24.

Figure 1G:
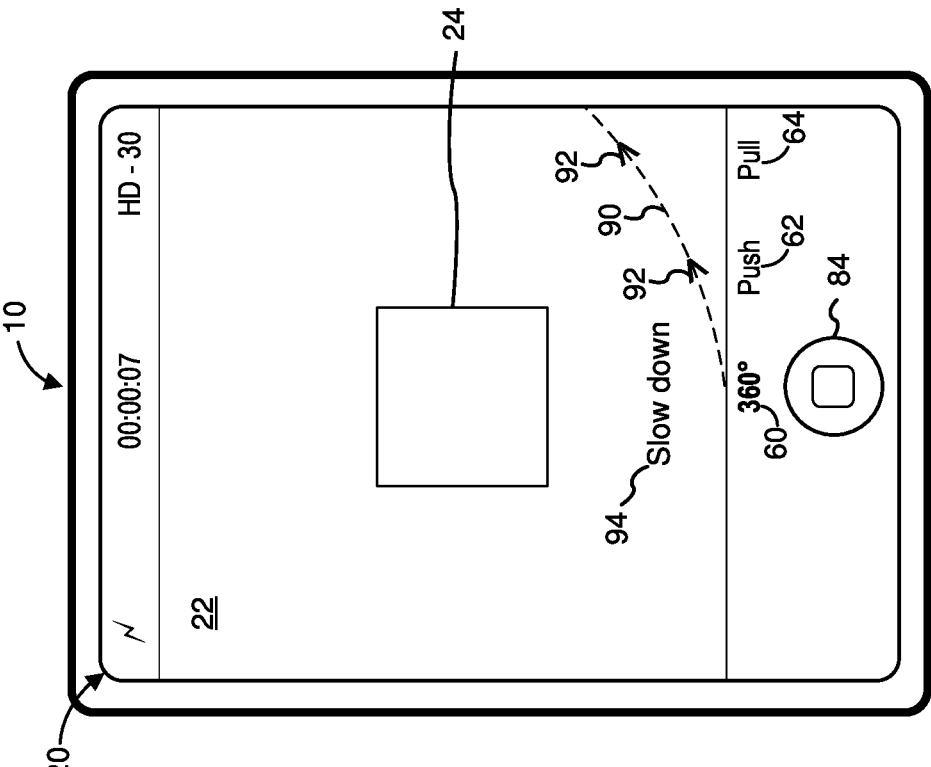

Referring to FIG. 1G, in some implementations, the electronic device 10 indicates a speed for the user to move along the circular path 90. In the example of FIG. 1G, the electronic device 10 prompts the user to slow down by displaying text 94. If the user is walking too fast, the electronic device 10 may not capture sufficient images of the subject 24 from all angles. Hence, if the user is walking too fast along the circular path 90, the electronic device 10 can display the text 94 to trigger the user to slow down.

Referring to FIG. 1H, the electronic device 10 displays additional directional arrows 92 on the circular path 90 as an indication for the user to walk faster along the circular path 90. In some implementations, the electronic device 10 displays text to prompt the user to walk faster (e.g., "walk faster"). Walking too slow may result in additional images being captured that unnecessarily occupy limited memory of the electronic device 10. Hence, displaying the additional directional arrows 92 may trigger the user to walk faster and result in excess images not being stored at the electronic device 10.

Figure 1J:
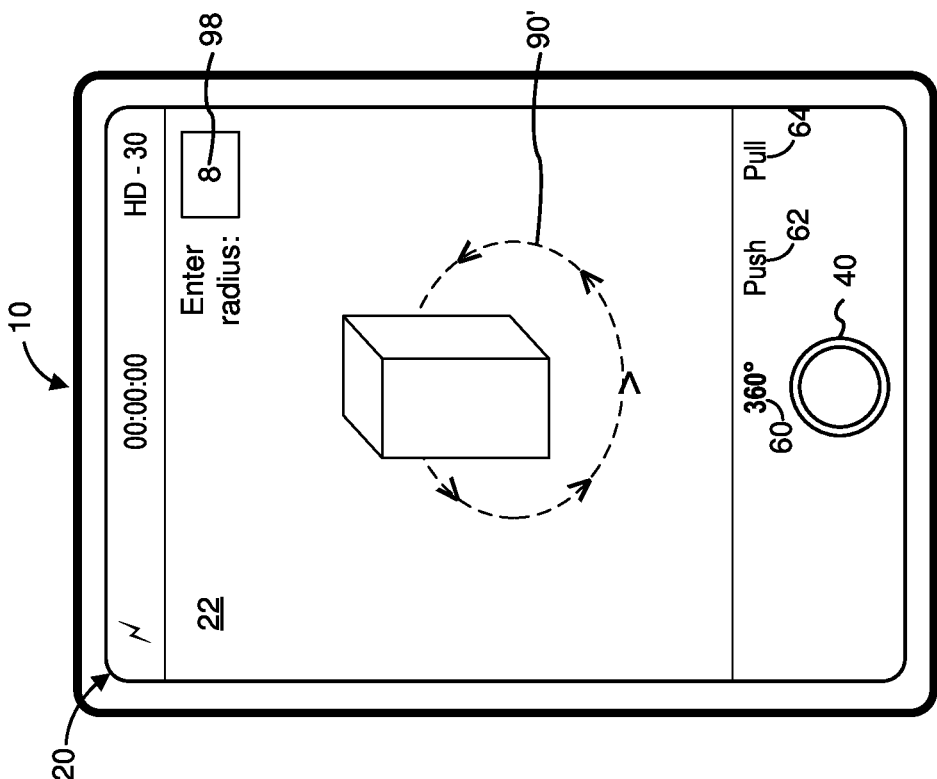
Figure 1I:
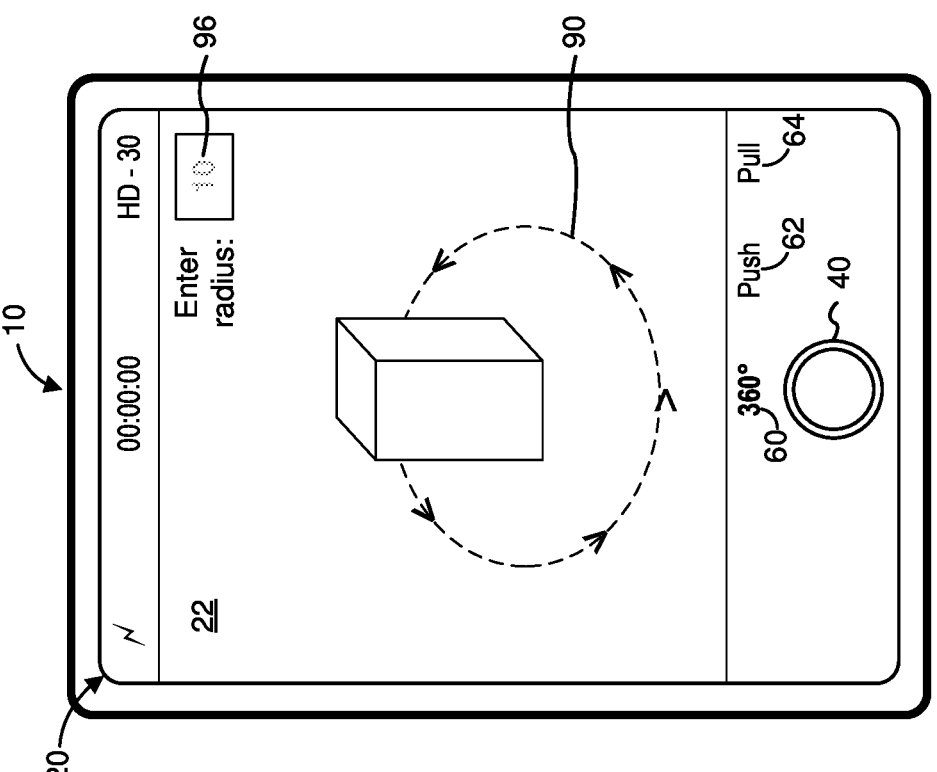
Figure 1L:
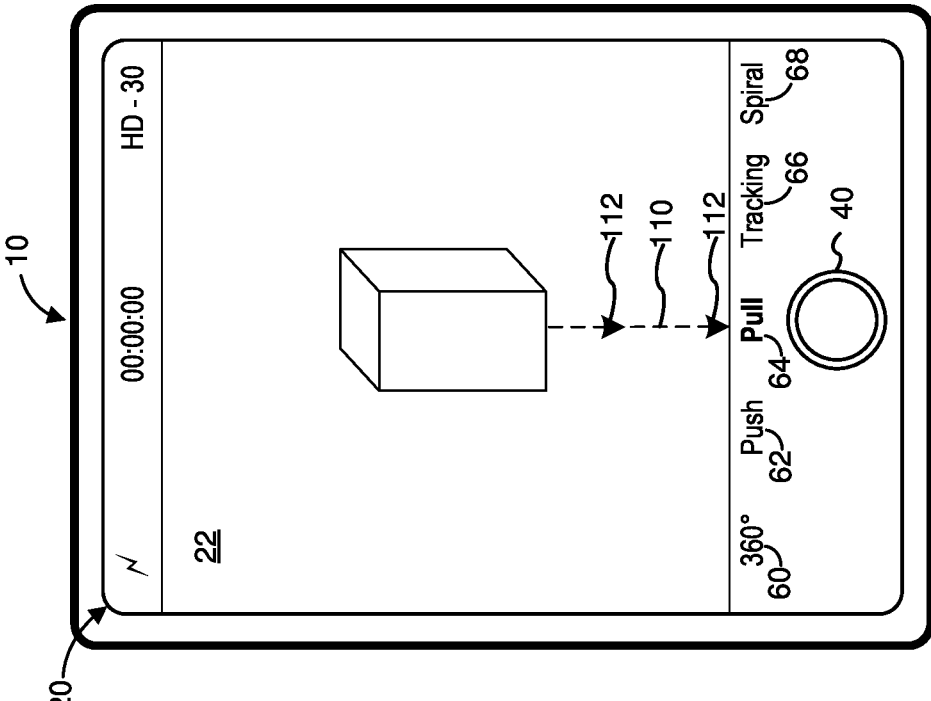
Figure 1K:
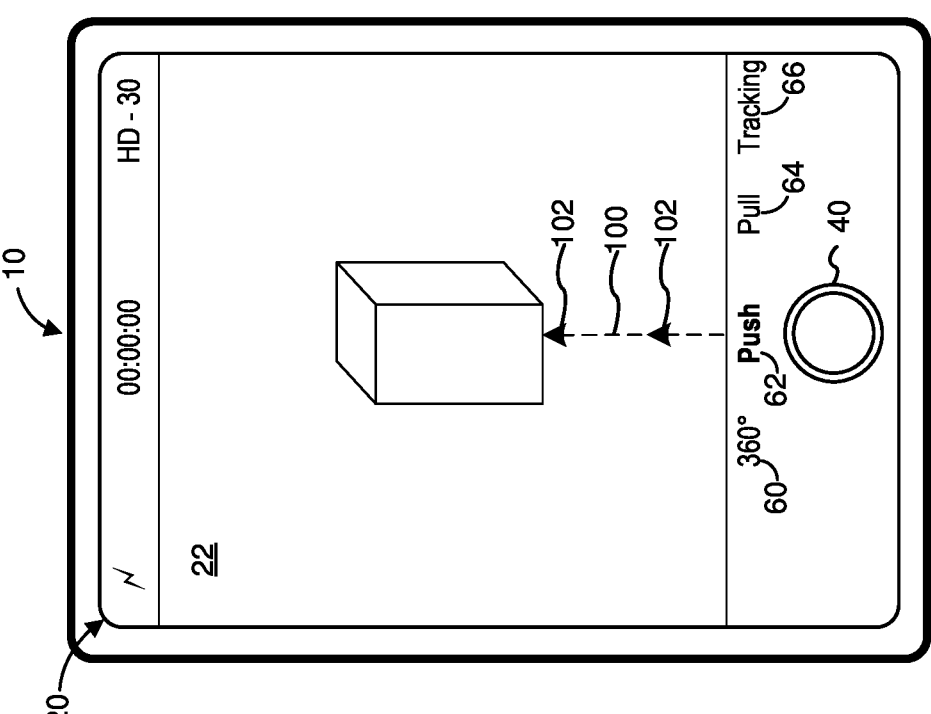
Figure 1N:
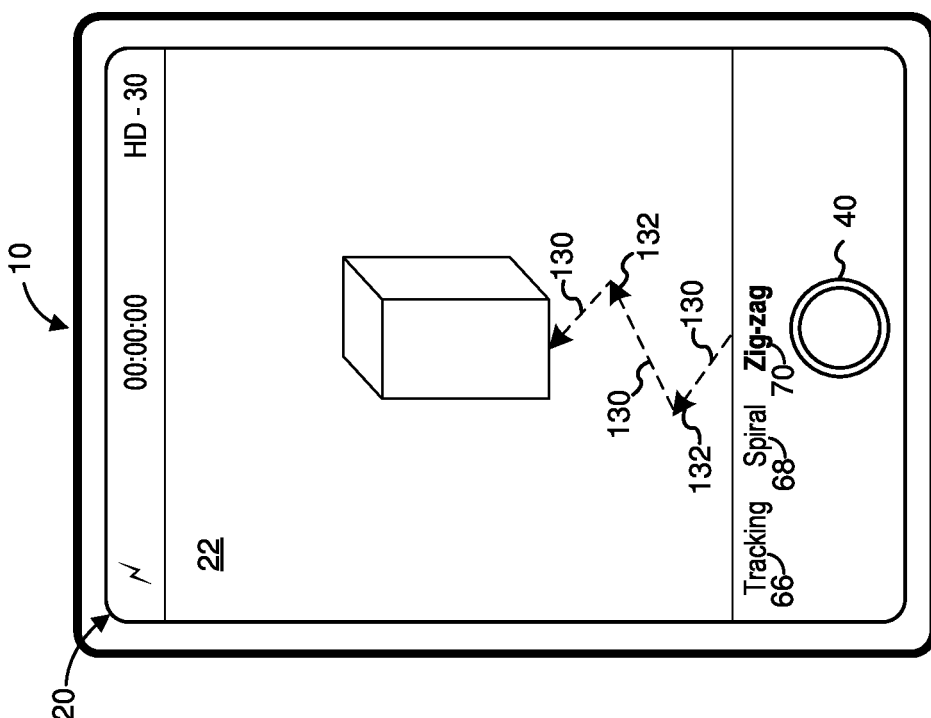
Figure 1M:
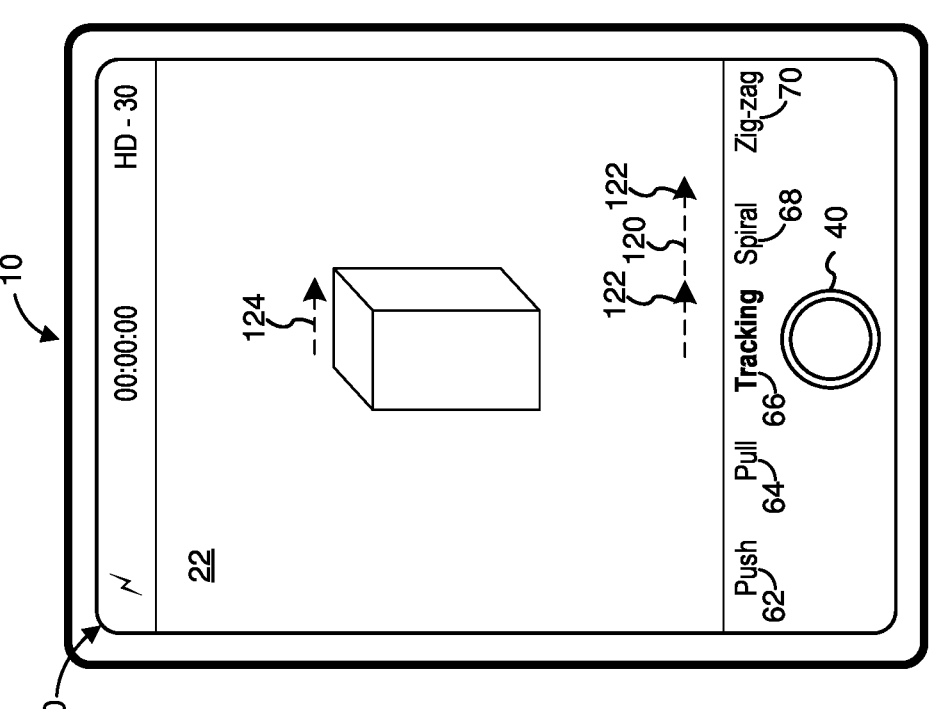
Figure 10:
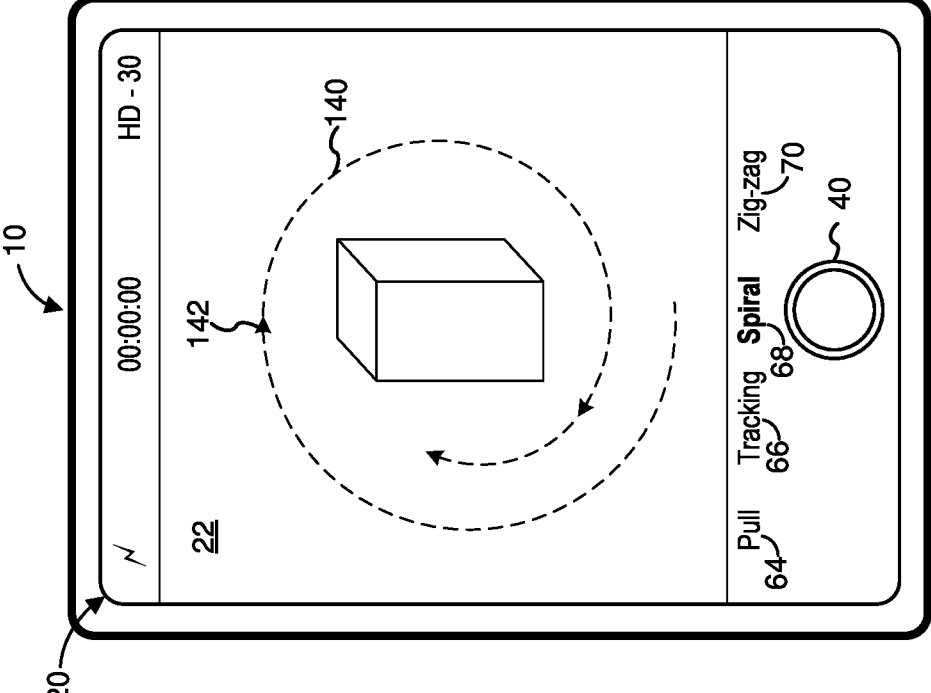

Referring to FIGS. 11 and 1J, in some implementations, the electronic device 10 provides the user an option to specify a dimension (e.g., a radius, a diameter or a circumference) of the circular path 90. In the example of FIG. 1I, the electronic device 10 includes a modifiable data field that displays a default radius value 96 (e.g., 10 inches or 10 feet). In the example of FIG. 1I, the circular path 90 has a radius that is equal to the default radius value 96.

Referring to FIG. 1J, the user may change the default radius value 96 shown in FIG. 1I to a user-specified radius value 98 (e.g., 8 inches or 8 feet). The electronic device 10 determines and displays a reduced circular path 90' based on the user-specified radius value 98. The reduced circular path 90' is smaller than the circular path 90 shown in FIG. 1I because the user-specified radius value 98 is smaller than the default radius value 96 shown in FIG. 1I.

Referring to FIG. 1K, the push shot affordance 62 is shown in bold and in the center indicating that the user has selected the push shot affordance 62. In response to the push shot affordance 62 being selected, the electronic device 10 displays a straight path 100 with directional arrows 102 that point towards the subject 24. To capture a push shot of the subject 24, the user of the electronic device 10 has to walk towards the subject 24 along the straight path 100 while capturing a video of the subject 24. Capturing a video of the subject 24 while walking towards the subject 24 along the straight path 100 results in a push shot that is within a degree of similarity to a push shot that is captured by a camera while the camera is being moved towards the subject 24 on a straight track.

Referring to FIG. 1L, the pull shot affordance 64 is shown in bold and in the center indicating that the user has selected the pull shot affordance 64. In response to the pull shot affordance 64 being selected, the electronic device 10 displays a straight path 110 with directional arrows 112 that point away from the subject 24. To capture a pull shot of the subject 24, the user of the electronic device 10 has to walk away from the subject 24 along the straight path 110 while capturing a video of the subject 24. Capturing a video of the subject 24 while walking away from the subject 24 along the straight path 110 results in a pull shot that is within a degree of similarity to a pull shot that is captured by a camera while the camera is being moved away from the subject 24 on a straight track.

Referring to FIG. 1M, the subject 24 is moving in a direction indicated by an arrow 124. As indicating by the arrow 124, the subject is moving towards the right. In the example of FIG. 1M, the tracking shot affordance 66 is shown in bold and in the center indicating that the user has selected the tracking shot affordance 66. In response to the tracking shot affordance 66 being selected, the electronic device 10 displays a tracking path 120 with directional arrows 122 that point in the same direction as the arrow 124. The tracking path 120 is parallel to the movement of the subject 24.

To capture a tracking shot of the subject 24, the user of the electronic device 10 has to walk along the tracking path 120 while capturing a video of the subject 24. When the user moves with the electronic device 10 along the tracking path 120, the electronic device 10 appears to be stationary relative to the subject 24 even though the electronic device 10 is being moved within the physical environment. Capturing a video of the subject 24 while moving along the tracking path 120 results in a tracking shot that is within a degree of similarity to a tracking shot that is captured by a camera while the camera is being moved on a track that is parallel to a directional movement of the subject 24.

Referring to FIG. 1N, the zig-zag shot affordance 70 is shown in bold and in the center indicating that the user has selected the zig-zag shot affordance 70. In response to the zig-zag shot affordance 70 being selected, the electronic device 10 displays a zig-zag path 130 with directional arrows 132 to guide the user along the zig-zag path 130. To capture a zig-zag shot of the subject 24, the user of the electronic device 10 has to move along the zig-zag path 130 while capturing a video of the subject 24. Capturing a video of the subject 24 while walking along the zig-zag path 130 results in a zig-zag shot that is within a degree of similarity to a zig-zag shot that is captured by a camera while the camera is being moved on a zig-zag track.

Referring to FIG. 1O, the spiral shot affordance 68 is shown in bold and in the center indicating that the user has selected the spiral shot affordance 68. In response to the spiral shot affordance 68 being selected, the electronic device 10 displays a spiral path 140 with directional arrows 142 to guide the user along the spiral path 140. To capture a spiral shot of the subject 24, the user of the electronic device 10 has to move along the spiral path 140 while capturing a video of the subject 24. Capturing a video of the subject 24 while walking along the spiral path 140 results in a spiral shot that is within a degree of similarity to a spiral shot that is captured by a camera while the camera is being moved on a spiral track.

Figure 2:
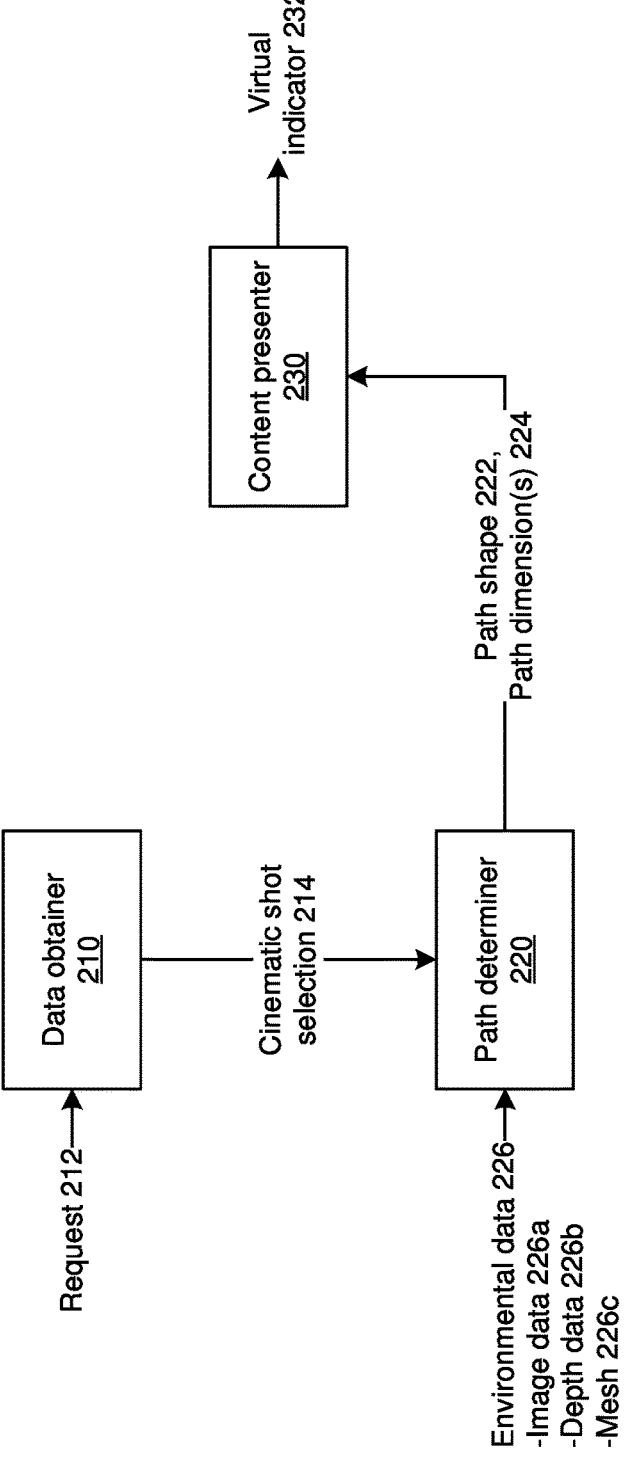
FIG. 2 is a block diagram of a system that displays a virtual indicator for capturing cinematic shots in accordance with some implementations.

FIG. 2 is a block diagram of a system 200 that displays a virtual indicator 232 that serves as a guide for capturing cinematic shots. In some implementations, the system 200 includes a data obtainer 210, a path determiner 220 and a content presenter 230. In various implementations, the system 200 resides at (e.g., is implemented by) the electronic device 10 shown in FIGS. 1A-1O.

In various implementations, the data obtainer 210 obtains a request 212 to capture a cinematic shot of a subject (e.g., the subject 24 shown in FIGS. 1A-1O). In some implementations, the request 212 includes a cinematic shot selection 214 that indicates a type of cinematic shot that is to be captured. In some implementations, the data obtainer 210 obtains the request 212 by detecting a user input that is directed to an affordance for a particular type of cinematic shot. For example, referring to FIG. 1D, in some implementations, the data obtainer 210 obtains the request 212 by detecting the user input 80 directed to the 360 degree shot affordance 60.

In various implementations, the path determiner 220 utilizes the cinematic shot selection 214 to determine a path for a user of a camera to traverse while recording a video with the camera. In some implementations, determining the path includes determining a path shape 222. For example, the path determiner 220 determines that the user has to walk along a circular path (e.g., the circular path 90 shown in FIG. 1E) that encircles the subject when the cinematic shot selection 214 indicates that the user intends to capture a 360 degree shot of the subject. As another example, the path determiner 220 determines that the user has to walk along a straight path towards the subject when the cinematic shot selection 214 indicates that the user intends to capture a push shot of the subject. As yet another example, the path determiner 220 determines that the user has to walk along a straight path away from the subject when the cinematic shot selection 214 indicates that the user intends to capture a pull shot of the subject. As another example, the path determiner 220 determines that the user has to walk alongside a moving subject (e.g., on the tracking path 120 shown in FIG. 1M) when the cinematic shot selection 214 indicates that the user intends to capture a tracking shot of the subject. As another example, the path determiner 220 determines that the user has to walk along a zig-zag path (e.g., the zig-zag path 130 shown in FIG. 1N) when the cinematic shot selection 214 indicates that the user intends to capture a zig-zag shot of the subject. As another example, the path determiner 220 determines that the user has to walk along a spiraling path (e.g., the spiral path 140) when the cinematic shot selection 214 indicates that the user intends to capture a spiral shot.

In various implementations, the path determiner 220 determines path dimensions 224 for the path. In some implementations, the path determiner 220 determines the path dimensions 224 based on a user input. For example, referring to FIG. 1J, the path determiner 220 determines the path dimensions 224 (e.g., a radius, a diameter or a circumference) for the reduced circular path 90' based on the user-specified radius value 98. In some implementations, the path determiner 220 determines the path dimensions 224 for the path based on a size of the subject. As an example, a radius of a circular path may be a function of an estimated size of the subject. In some implementations, the path dimensions 224 are proportional to the size of the subject (e.g., the larger the subject, the larger the path that the user has to walk in order to capture a cinematic shot of the subject).

In some implementations, the path determiner 220 utilizes environmental data 226 to determine the path (e.g., to determine the path shape 222 and/or the path dimensions 224). In some implementations, the environmental data 226 includes image data 226a, depth data 226b and/or a mesh 226c of the physical environment where the subject is located. The path determiner 220 can utilize the image data 226a and/or the depth data 226b to generate the mesh 226c of the physical environment. In some implementations, the path determiner 220 utilizes the environmental data 226 to determine the path shape 222 and/or the path dimensions 224 such that the path avoids obstacles in the physical environment. For example, the path determiner 220 can set a diameter of a circular path for a 360 degree shot such that the circular path does not intersect with physical articles that are in the physical environment. As another example, the path determiner 220 can set a length of a straight path for a push shot or a pull shot such that the user would not collide with a physical object while walking along the straight path. As another example, the path determiner 220 can set angles of a zig-zag path to avoid physical obstacles (e.g., a coffee table, a couch, etc.) indicated by the environmental data 226. As yet another example, the path determiner 220 can set a curvature of a spiral path such that the spiral path does not intersect with physical articles indicated by the environmental data 226.

In various implementations, the content presenter 230 generates and presents the virtual indicator 232 based on the path shape 222 and the path dimensions 224. In some implementations, the content presenter 230 overlays the virtual indicator 232 onto a pass-through of the physical environment of the subject. For example, referring to FIG. 1E, the content presenter 230 overlays the circular path 90 onto the preview 22. As the user walks along the path indicated by the virtual indicator 232, the content presenter 230 can modify the virtual indicator 232 to keep the user moving along the path at a target speed. For example, the content presenter 230 can modify the virtual indicator 232 to indicate whether the user should slow down or speed up in order to capture sufficient image data for the cinematic shot. For example, referring to FIG. 1G, the content presenter 230 displays the text 94 to trigger the user to walk slower and avoid capturing insufficient images along the circular path 90.

Figure 3:
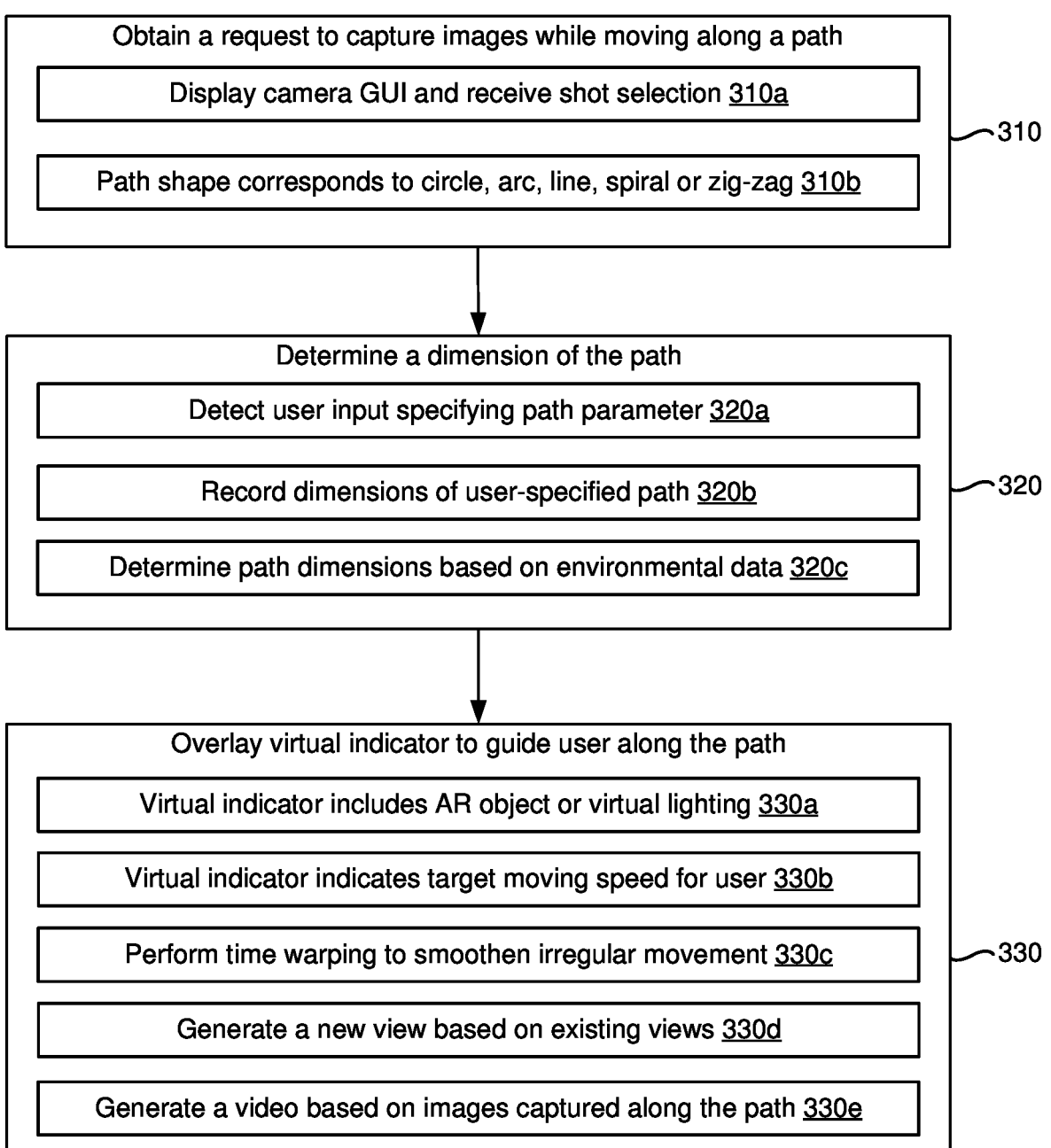
FIG. 3 is a flowchart representation of a method of displaying a virtual indicator for cinematic shots in accordance with some implementations.

FIG. 3 is a flowchart representation of a method 300 for displaying a virtual indicator for cinematic shots. In various implementations, the method 300 is performed by a device including a display, an environmental sensor, a non-transitory memory and one or more processors coupled with the display, the environmental sensor and the non-transitory memory (e.g., the electronic device 10 shown in FIGS. 1A-1O and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining a request to capture a sequence of images depicting a subject. In some implementations, the sequence of images is to be captured while an image sensor is being moved along a path with a predefined shape. In some implementations, the sequence of images is a video. For example, as shown in FIG. 1D, the electronic device 10 detects the user input 80 directed to the 360 degree shot affordance 60 that corresponds to a request to capture a 360 degree video of the subject 24.

As represented by block 310a, in some implementations, obtaining the request to capture the sequence of images includes displaying a graphical user interface (GUI) for a camera application. In some implementations, the GUI includes selectable affordances that represent options to capture different cinematic shots. In some implementations, the method 300 includes detecting a user selection of one of the selectable affordances that corresponds to the predefined shape. For example, as shown in FIG. 1C, the electronic device 10 displays the camera interface that includes the 360 degree shot affordance 60 for capturing a 360 degree video, the push shot affordance 62 for capturing a push shot, the pull shot affordance 64 for capturing a pull shot, the tracking shot affordance 66 for capturing a tracking shot, the spiral shot affordance 68 for capturing a spiral shot and the zig-zag shot affordance 70 for capturing a zig-zag shot.

As represented by block 310b, in some implementations, the predefined shape is a circle and the subject is located at a center of the circle. For example, as shown in FIG. 1E, the electronic device 10 displays the circular path 90 that surrounds the subject 24. As described in relation to FIG. 1E, capturing a video of the subject 24 while the electronic device 10 is moved along the circular path 90 results in a 360 degree video of the subject 24 that is similar to a video shot captured by a camera that is being moved on a circular track that surrounds the subject 24. In some implementations, the predefined shape is an arc and the subject is located at a center of the arc.

In some implementations, the predefined shape is a line that leads towards the subject. For example, as shown in FIG. 1K, the electronic device 10 displays the straight path 100 with the directional arrows 102 that point towards the subject 24. As described in relation to FIG. 1K, capturing a video of the subject 24 while the electronic device 10 is being moved along the path 100 in a direction indicated by the directional arrows 102 results in a push shot of the subject that is similar to a video shot captured by a camera that is being pushed towards the subject 24 on a physical track.

In some implementations, the predefined shape is a line that leads away from the subject. For example, as shown in FIG. 1L, the electronic device 10 displays the straight path 110 with the directional arrows 112 that point away from the subject 24. As described in relation to FIG. 1L, capturing a video of the subject 24 while the electronic device 10 is being moved along the path 110 in a direction indicated by the directional arrows 112 results in a pull shot of the subject that is similar to a video shot captured by a camera that is being pulled away from the subject 24 on a physical track.

In some implementations, the predefined shape is a spiral that leads towards the subject or away from the subject. For example, as shown in FIG. 1O, the electronic device 10 displays the spiral path 140 that, when followed in the direction of the directional arrows 142, leads towards the subject 24. As described in relation to FIG. 1O, capturing a video of the subject 24 while the electronic device 10 is being moved along the spiral path 140 in a direction indicated by the directional arrows 142 results in a spiral shot of the subject that is similar to a video captured by a camera that is being moved on a spiraling physical track.

In some implementations, the predefined shape is a zig-zag that leads towards the subject or away from the subject. For example, as shown in FIG. 1N, the electronic device 10 displays the zig-zag path 130 that, when followed in the direction of the directional arrows 132, leads towards the subject 24. As described in relation to FIG. 1N, capturing a video of the subject 24 while the electronic device 10 is being moved along the zig-zag path 130 results in a zig-zag shot of the subject 24 that is similar to a zig zag-shot captured by a camera that is being moved on a zig-zag track.

In some implementations, the predefined shape is a line that is parallel to a trajectory of the subject. For example, as shown in FIG. 1M, the electronic device 10 displays the tracking path 120 that, when followed in the direction of the directional arrows 122, causes the electronic device 10 to track a movement of the subject 24 through the physical environment. As described in relation to FIG. 1M, capturing a video of the subject 24 while the electronic device 10 is moved along the tracking path 120 results in a tracking shot of the subject 24 that is similar to a tracking shot captured by a camera that is being moved on a physical track or a physical line that is set up in parallel to the subject movement indicated by the arrow 124.

As represented by block 320, in various implementations, the method 300 includes determining a dimension of the path. For example, as shown in FIG. 1E, the electronic device determines a size (e.g., a radius) of the circular path 90 in response to detecting the user input directed to the 360 degree shot affordance 60. As another example, the path determiner 220 determines the path shape 222 and the path dimensions 224 based on the cinematic shot selection 214 indicated by the request 212.

As represented by block 320a, in some implementations, determining the dimension of the path includes detecting a user input that specifies a numerical value indicative of the dimension of the path. For example, as shown in FIG. 1J, the electronic device 10 detects entry of the user-specified radius value 98, and the electronic device 10 generates the reduced circular path 90' based on the user-specified radius value 98.

As represented by block 320b, in some implementations, determining the dimension of the path includes obtaining a user request to record the path as a user of the device walks along the path, and capturing environmental data that indicates the dimension of the path. For example, the user can specify that the user wants to define a path. In this example, the user can define a path by allowing the device to capture environmental data (e.g., images, depth data, IMU data) that indicates movement of the device through the physical environment. The device can generate a map that indicates the path defined by the user. The device can store the path defined by the user so that the device can display a virtual indicator of the path in order to allow the user or another person to walk along the path while recording a video. In some implementations, an expert can curate a path and another person can walk along the path curated by the expert while capturing a video of a subject. For example, a museum curator can curate a path through a museum, and a visitor can walk along the curated path while capturing a video of one or more artifacts (e.g., statues and/or paintings) in order to generate a cinematic shot.

As represented by block 320c, in some implementations, determining the dimension of the path includes obtaining, via the environmental sensor, environmental data corresponding to a physical environment of the subject, and determining the dimension based on the environmental data. In some implementations, the environmental data includes images and/or depth data related to the physical environment. In some implementations, determining the dimension of the path includes determining the dimension such that the path avoids obstacles in the physical environment. The device can utilize the environmental data to identify physical articles in the physical environment of the subject, and set a dimensional value of the path so that the path does not intersect with the physical articles in the physical environment. For example, the device can set a relatively large radius for a circular path if the physical environment includes a physical article that would interfere with a circular path with a smaller radius.

In some implementations, determining the dimension of the path includes determining the dimension based on a size of the subject. In some implementations, the dimension of the path is proportional to the size of the subject. As an example, the radius of a circular path for a 360 degree video shot is a function of a size of the subject. For example, the radius may be relatively large for a relatively big subject such as a historical building, and the radius may be relatively small for a relatively small subject such as a necklace. As another example, a length of a straight path for a push shot or a pull shot may be a function of a volume of the subject. For example, the length of the straight path can be set to a relatively large value for a relatively big subject such as a bridge, and the length of the straight path can be set to a relatively small value for a relatively small subject such as a puppy.

In some implementations, determining the dimension of the path includes generating a mesh of the physical environment based on the environmental data, and determining the dimension of the path based on the mesh of the physical environment. In some implementations, the method 300 includes generating the mesh based on image data and/or depth data captured by an environmental sensor. In some implementations, the device utilizes the mesh to set the dimension of the path such that the path avoids obstacles.

As represented by block 330, in various implementations, the method 300 includes overlaying, on a representation of a physical environment, a virtual indicator that indicates the path with the dimension and the predefined shape. In various implementations, the virtual indicator guides a user of the device along the path while capturing the sequence of the images with the image sensor. For example, as shown in FIG. 1N, the electronic device 10 overlays the zig-zag path 130 on a pass-through of the physical environment represented by the preview 22. The zig-zag path 130 guides the user in capturing a zig-zag shot of the subject 24. In some implementations, the representation of the physical environment includes a pass-through representation of the physical environment (e.g., a video pass-through of the physical environment or an optical see-through of the physical environment). Alternatively, in some implementations, the representation of the physical environment includes a reproduction of the physical environment (e.g., the device synthesizes a virtual environment that resembles the physical environment).

As represented by block 330*a*, in some implementations, the virtual indicator includes an augmented reality (AR) object. For example, as shown in FIGS. 1E and 1F, the electronic device 10 shows the circular path 90 as a dotted line with the directional arrows 92 in order to guide the user as the user captures a 360 degree video of the subject 24. In some implementations, the virtual indicator includes virtual lighting that appears to illuminate the path. For example, in some implementations, the device can increase a brightness value of pixels that correspond to the path in order to provide an appearance that the path is lit. The device can display the virtual lighting in addition to or as an alternative to displaying a dotted line or another marker that marks the path.

As represented by block 330*b*, in some implementations, the virtual indicator indicates a speed for the user to move along the path. In some implementations, the device determines a target speed for the user to move along the path so that the camera captures sufficient images of the subject as the camera is being moved along the path. If the user's speed exceeds the target speed, the device can display an indicator to slow down to capture sufficient images (e.g., the text 94 shown in FIG. 1G). If the user's speed is below the target speed, the device can display an indicator to speed up to avoid capturing unnecessary images (e.g., the additional directional arrows 92 shown in FIG. 1H). In some implementations, the target speed is a function of the user's physical abilities (e.g., the user's fitness level indicated by the user's exercise history). For example, the target speed for an athlete may be greater than a target speed for a non-athlete.

As represented by block 330*c*, in some implementations, the method 300 includes, after capturing the sequence of images, performing a time warping operation with respect to at least a subset of the sequence of images in order to compensate for irregular movements along the path. In some implementations, the device warps at least some of the images in order to provide an appearance that the camera was not moving in an undesired dimension. For example, when the images are to form a 360 degree video, the device can warp images vertically in order to provide an appearance that the camera was not being moved in a vertical dimension. In this example, even though the user may have inadvertently moved the camera in the vertical dimension, the device can provide an appearance that the camera was not moving in the vertical dimension by warping the images vertically.

As represented by block 330*d*, in some implementations, the method 300 includes, after capturing the sequence of images, generating a new view based on existing views represented by the sequence of images in order to compensate for insufficient (e.g., missing) images along the path. In some implementations, the device may not have captured images from various segments of the path. For example, the user may have inadvertently pointed the camera in a different direction so that the subject was not in a field-of-view of the camera while the camera was being moved through a particular segment of the path. In such implementations, the device can utilize methods and/or systems associated with novel view synthesis to synthesize a view of the subject based on other images that depict the subject from different views. For example, if the device does not have an image depicting the subject from a particular segment of the path, the device can use images from adjacent segments of the path to synthesize a view that corresponds to the particular segment. As such, the device may be able to compensate for missing views from some of the segments of the path. In some implementations, the device can utilize novel view synthesis to compensate for movement of the device away from the path. For example, if the path is circular and the device is moved along an oval-shaped path, the device can use novel view synthesis to warp the captured images and provide an appearance that the device was moved along the circular path.

As represented by block 330*e*, in some implementations, the method 300 includes identifying, from a plurality of previously-captured images, a subset of the plurality of previously-captured images that was captured along the path, and generating a video based on the subset that was captured along the path. In some implementations, the user can define a path and the device can generate a video that includes images that were previously captured along the path defined by the user. For example, the user may have visited a city and taken pictures from various different spots within the city. In this example, the user can later define a path and the device can synthesize a video that includes images that were captured along the path that the user defined.

Figure 4:
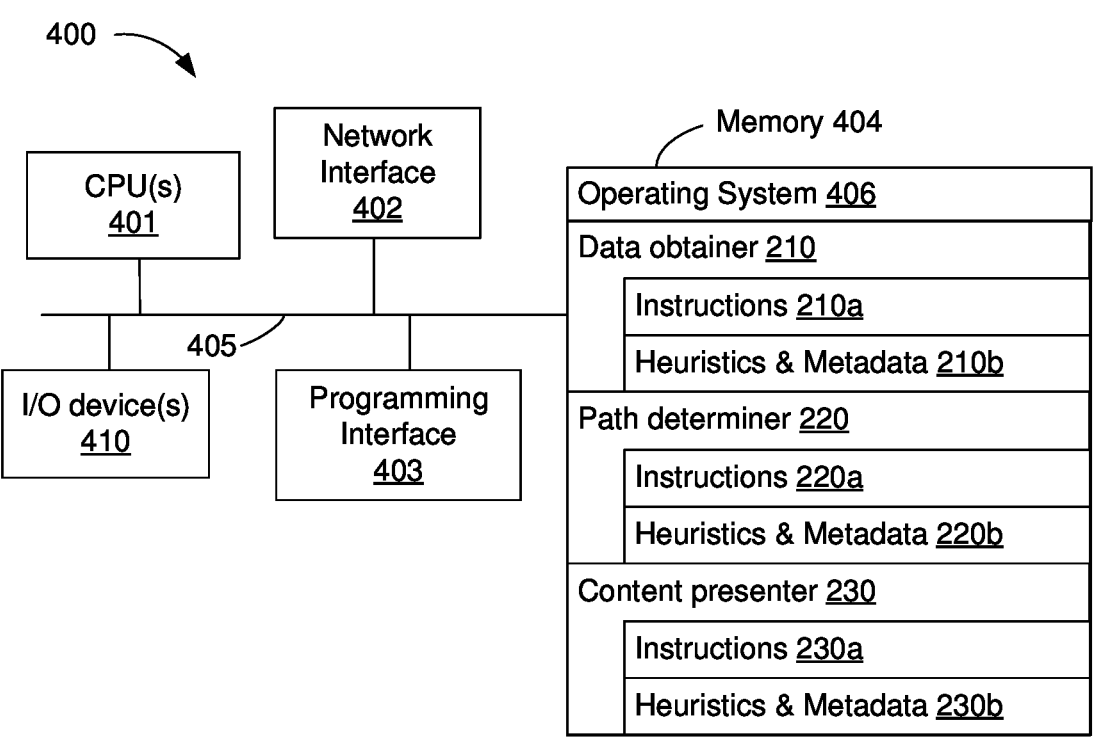
FIG. 4 is a block diagram of a device that displays a virtual indicator for cinematic shots in accordance with some implementations.

FIG. 4 is a block diagram of a device 400 in accordance with some implementations. In some implementations, the device 400 implements the electronic device 10 shown in FIGS. 1A-1O and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the path determiner 220 and the content presenter 230. In various implementations, the device 400 performs the method 300 shown in FIG. 3.

In some implementations, the data obtainer 210 includes instructions 210a, and heuristics and metadata 210b for obtaining a request to capture images of a subject while a camera is being moved along a path (e.g., the request 212 shown in FIG. 2). In some implementations, the data obtainer 210 performs at least some of the operation(s) represented by block 310 in FIG. 3.

In some implementations, the path determiner 220 includes instructions 220a, and heuristics and metadata 220b for determining a dimension of the path (e.g., the path shape 222 and/or the path dimensions 224 shown in FIG. 2). In some implementations, the path determiner 220 performs at least some of the operation(s) represented by block 320 in FIG. 3.

In some implementations, the content presenter 230 includes instructions 230a, and heuristics and metadata 230b for presenting a virtual indicator that indicates the path (e.g., the circular path 90 shown in FIG. 1E). In some implementations, the content presenter 230 performs at least some of the operation(s) represented by block 330 in FIG. 3.

In some implementations, the one or more I/O devices 408 include an input device for obtaining an input (e.g., for detecting the user input 80 shown in FIG. 1D). In some implementations, the input device includes a touchscreen (e.g., for detecting tap inputs), an image sensor (e.g., for detecting gesture inputs) and/or a microphone (e.g., for detecting voice inputs). In some implementations, the one or more I/O devices 408 include an environmental sensor for capturing environmental data (e.g., the environmental data 226 shown in FIG. 2). In some implementations, the one or more I/O devices 408 include one or more image sensors. For example, the one or more I/O devices 408 may include a rear-facing camera of a smartphone or a tablet for capturing images (e.g., a video). As another example, the one or more I/O devices 408 may include a scene-facing camera of an HMD for capturing images (e.g., a video). In some implementations, the one or more I/O devices 408 include a display for displaying a virtual indicator of a path determined by the path determiner 220 (e.g., the virtual indicator 232 shown in FIG. 2).

In various implementations, the one or more I/O devices 408 include a video pass-through display which displays at least a portion of a physical environment surrounding the device 400 as an image captured by a camera (e.g., for displaying the preview 22 shown in FIGS. 1A-1O). In various implementations, the one or more I/O devices 408 include an optical see-through display which is at least partially transparent and passes light emitted by or reflected off the physical environment (e.g., for displaying the preview 22 shown in FIGS. 1A-1O).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

In cinematography, various entities rely on a physical storyboard to determine respective paths that the entities need to follow in order to capture a cinematic shot. For example, the storyboard may specify a first path for a camera operator to follow while the camera operator captures images via a camera and a second path for an actor to follow while the camera captures the images. The storyboard may indicate respective paths for other entities to follow while the cinematic shot is being captured. For example, the storyboard may indicate respective paths for another camera operator operating another camera, a boom operator operating a boom mic and a gaffer operating a lighting equipment. Using a physical storyboard is prone to errors because some of the entities may forget their path and/or may steer off their path during the cinematic shot. For example, the camera operator may forget that the storyboard specified for him/her to follow in order to capture the desired cinematic shot. Moreover, a physical storyboard does not allow for live communication between the director and crew members during the cinematic shot without interfering with the actors. For example, the director may not be able to communicate to the camera operator to adjust his/her trajectory in order to stay on the camera operator's specified path without interfering with the actor's dialogues.

The present disclosure provides methods, systems, and/or devices for generating a path for an entity to follow during a cinematic shot. A director device detects a user input that corresponds to a request to generate a path for an entity to follow during a cinematic shot. For example, a director can use the director device to specify a path for a camera operator to follow in order to capture a desired cinematic shot. As an example, the director may use his/her hands to draw the path for the camera operator to follow on a touchscreen of the director's device. The director device sends an indication of the path to another device that is associated with the entity. For example, the director device may transmit information that indicates a shape of the path to a camera operator device that the camera operator is using. During the cinematic shot, the camera operator device displays a virtual indicator of the path as an overlay on top of a pass-through of the physical environment. Since the camera operator device displays the virtual indicator of the path, the camera operator may not need to rely on a physical storyboard to determine his/her path during the cinematic shot.

The director device can generate respective paths for various entities in the physical environment. For example, the director device may allow the director to specify a first camera operator path for a first camera operator to move a first camera along, a second camera operator path for a second camera operator to move a second camera along, an actor path for an actor to walk along, a boom operator path for a boom operator to move a boom mic along, and a gaffer path for a gaffer to move a lighting equipment along. The director device communicates the paths to respective devices corresponding to the entities. For example, the director device sends information regarding the first camera operator path to a first camera operator device being used by the first camera operator, information regarding the second camera operator path to a second camera operator device being used by the second camera operator, information regarding the actor path to an actor device being used by the actor, information regarding the boom operator path to a boom operator device being used by the boom operator, and information regarding the gaffer path to a gaffer device being used by the gaffer.

The director may use the director device to specify the path. For example, the director can specify the path by providing a gesture input. The director device may include a touchscreen and the director can draw the path on the touchscreen. Additionally or alternatively, the director device may include a camera for tracking three-dimensional (3D) gestures and the director can make a 3D gesture to specify the path. In addition to or as an alternative to providing a gesture, the director can specify the path by allowing an environmental sensor of the director device to record the director's movements and let the path be defined by the recorded movements of the director. Additionally or alternatively, the director can select a cinematic shot that is associated with a path (e.g., by selecting a 360° shot, a pull shot, a push shot, etc.).

The director may specify a path for a particular entity and paths for other entities can be determined based on the path that the director specified for that particular entity. As an example, the director may specify a path for a primary camera operator, and the director device may automatically determine a path for a secondary camera operator based on the path that the director specified for the primary camera operator. In this example, the director device may automatically determine a path for a light gaffer, a boom operator and other entities based on the path that the director specified for the primary camera operator. For example, the director device may determine the path for the light gaffer such that lighting equipment being carried by the light gaffer sufficiently lights a subject in a field-of-view of the primary camera. Similarly, the director device may determine the path for the boom operator such that the boom mic being carried by the boom operator sufficiently captures audible signal data generated by the subject in the field-of-view of the primary camera.

After the director specifies a path for an entity such as a camera operator, the director device can generate and present a simulated shot according to the path that the director specified in order to provide an indication of how the shot would appear if the camera operator follows the path that the director has specified. The director can adjust the specified path based on the simulated shot. For example, the director device can display a virtual indicator of the path on a touchscreen display and the director can drag portions of the virtual indicator to adjust a shape of the path and/or a dimension of the path.

During the cinematic shot or after cinematic shot, the director device determines whether an actual path of the camera operator is within a threshold of the path that the director specified. The director device indicates a difference between the actual path and the specified path. The director device provides the director with an option to send prompts to the camera operator device in order to help the camera operator adhere to the path that the director specified. For example, the director can prompt the camera operator to move faster, slow down, etc.

Some cinematic shots may include the use of multiple cameras that are operated by different camera operators. The director device may generate respective paths for each of the camera operators to follow. After the various camera operators have followed their respective paths, the director device can display lines representing the paths that the camera operators followed. The director device can provide an option for the director to select certain video segments from different videos captured by the various cameras.

Figure 5A:
FIGS. 5A-5H are diagrams of an example operating environment in accordance with some implementations.

FIG. 5A is a diagram that illustrates an example operating environment 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, in various implementations, the operating environment 500 includes an actor 510, a director 520, a director device 522 being used by the director 520 to direct a cinematic shot, a camera operator 530, a camera 532 for capturing the cinematic shot and a camera operator device 534 being used by the camera operator 530.

In various implementations, the actor 510 is a person that is being filmed. The director 520 is a person that is directing how the actor 510 is to be filmed. The director 520 provides directions to the camera operator 530 on how to operate the camera 532 in order to capture a desired cinematic shot of the actor 510. The camera operator 530 is a person that operates (e.g., manipulates, for example, translates and/or rotates) the camera 532. The camera operator 530 follows the directions of the director 520 in order to capture the desired cinematic shot of the actor 510.

In some implementations, the director device 522 includes a handheld computing device that can be held by the director 520. For example, in some implementations, the director device 522 includes a smartphone, a tablet, a media player, a laptop, or the like. In some implementations, the director device 522 includes a wearable computing device that can be worn by the director 520. For example, in some implementations, the director device 522 includes a head-mountable device (HMD) that the director 520 wears on his/her head or an electronic watch that the director 520 wears on his/her wrist.

In some implementations, the camera operator device 534 includes a handheld computing device that can be held by the camera operator 530. For example, in some implementations, the camera operator device 534 includes a smartphone, a tablet, a media player, a laptop, or the like. In some implementations, the camera operator device 534 includes a wearable computing device that can be worn by the camera operator 530. For example, in some implementations, the camera operator device 534 includes a head-mountable device (HMD) that the camera operator 530 wears on his/her head or an electronic watch that the camera operator 530 wears on his/her wrist. In the example of FIG. 5A, the camera 532 and the camera operator device 534 are shown as being separate devices. However, in some implementations, the camera operator device 534 and the camera 532 are the same. For example, the camera 532 may be integrated into the camera operator device 534. As an example, the camera operator device 534 may be a smartphone and the camera 532 may be a rear-facing camera of the smartphone.

In various implementations, the director device 522 detects an input 524 that corresponds to a request to generate a path for the camera operator 530 to follow while the camera 532 captures a target cinematic shot. The director device 522 generates the path for the camera operator 530 to follow in order to capture the target cinematic shot. As illustrated in FIG. 5A, the director device 522 transmits a path indication 526 to the camera operator device 534. The path indication 526 includes information regarding the path. For example, the path indication 526 may indicate a shape of the path, a dimension of the path and/or a speed at which the path is to be traversed. Upon receiving the path indication 526, the camera operator device 534 displays a virtual indicator 528 of the path. In some implementations, the camera operator device 534 overlays the virtual indicator 528 of the path on top of a pass-through of the operating environment 500. For example, the virtual indicator 528 may be an augmented reality (AR) object (e.g., AR dashed lines) that is displayed on top of a view of the operating environment 500.

In various implementations, the camera operator device 534 includes a display that displays the virtual indicator 528 and a camera application that controls operation of the camera 532. In some implementations, the camera operator device 534 includes the camera 532 (e.g., the camera 532 is integrated into the camera operator device 534). Alternatively, in some implementations, the camera 532 is separate from the camera operator device 534 and the camera operator device 534 controls the camera via a control channel (e.g., a wireless control channel, for example, via short-range wireless communication).

In various implementations, a camera application installed on the camera 532 and/or the camera operator device 534 generates and presents a camera interface for controlling the camera 532 (e.g., similar to the camera interface 20 shown in FIG. 1A). The camera interface includes a preview of an image that can be captured by pressing a capture affordance (e.g., similar to the preview 22 shown in FIG. 1A). The preview includes two-dimensional (2D) representations of physical articles that are in a field-of-view of the camera 532. For example, the preview may include a 2D representation of the actor 510. In some implementations, the preview may be referred to as a pass-through of the operating environment 500. If the camera operator device 534 includes an opaque display, the preview may be referred to as a video pass-through of the operating environment 500. If the camera operator device 534 includes an optical see-through display, the preview may be referred to as an optical see-through of the operating environment 500. The camera application may display the virtual indicator 528 within the camera interface. For example, the camera application may overlay the virtual indicator 528 onto the preview of the image that can be captured by the camera 532 (e.g., similar to the circular path 90 shown in FIG. 1E).

Figure 5B:
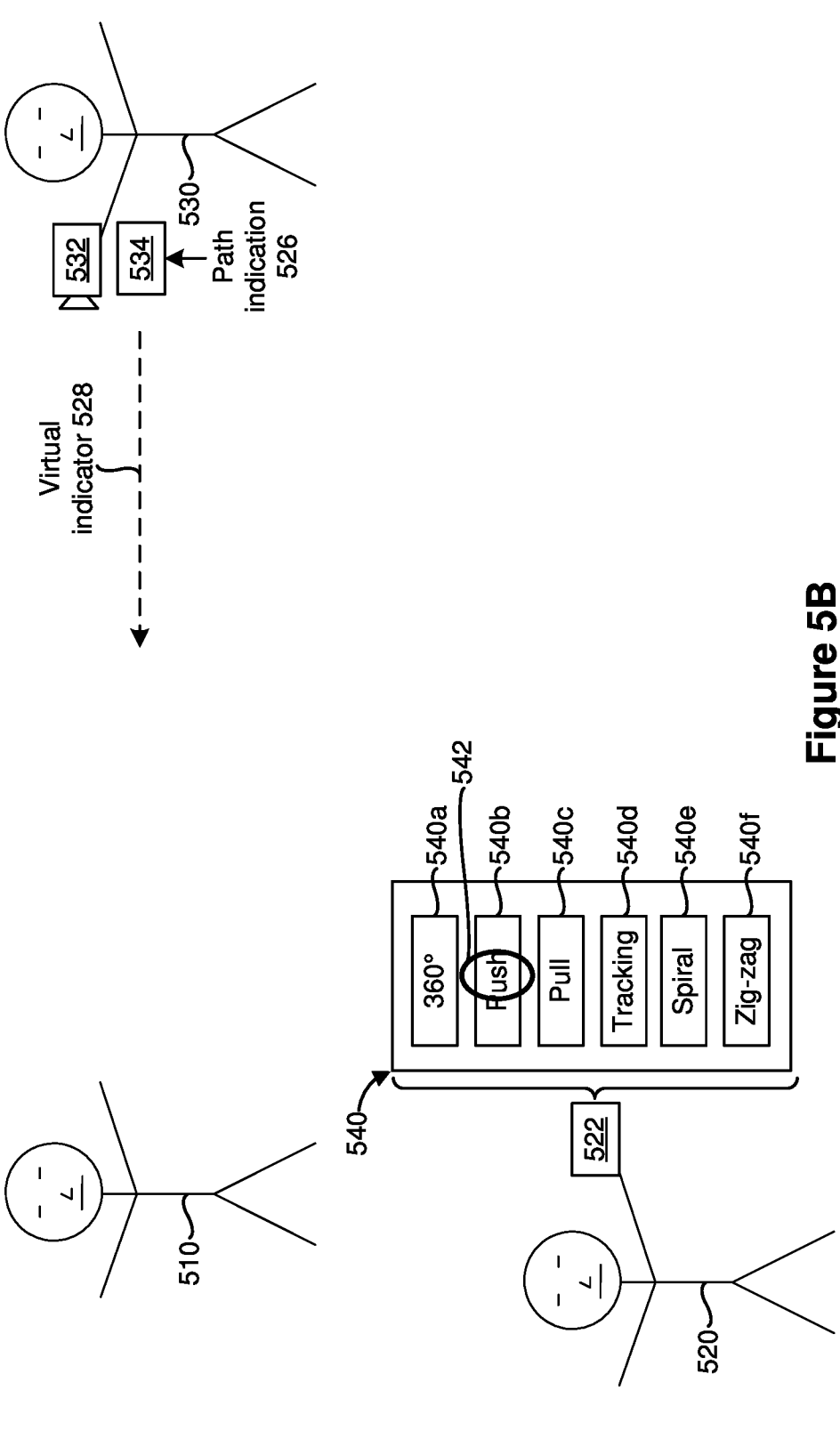

As described in relation to FIG. 5B, in various implementations, the input 524 includes a cinematic shot selection. As described in relation to FIGS. 5C-5E, in some implementations, the input 524 includes a hand-drawn path. Referring to FIG. 5B, in some implementations, the director device 522 displays a user interface 540 that includes selectable affordances for various cinematic shots. In the example of FIG. 5B, the user interface 540 includes a 360 degree shot affordance 540a for selecting a 360 degree shot, a push shot affordance 540b for selecting a push shot, a pull shot affordance 540c for selecting a pull shot, a tracking shot affordance 540d for selecting a tracking shot, a spiral shot affordance 540e for selecting a spiral shot, and a zig-zag shot affordance 540f for selecting a zig-zag shot. Additional or alternative shot affordances are also contemplated for other types of cinematic shots.

In the example of FIG. 5B, the director device 522 detects a user input 542 directed to the push shot affordance 540b. The user input 542 corresponds to a selection of the push shot from the set of cinematic shots available for selection. Detecting the user input 542 may include detecting a contact at a location corresponding to the push shot affordance 540b. For example, detecting a tap at the location corresponding to the push shot affordance 540b. After detecting the user input 542, the director device 522 transmits the path indication 526 to the camera operator device 534. Since the push shot is captured by pushing the camera 532 in a straight line towards the actor 510, the path indication 526 indicates a linear path that starts at a position corresponding to the camera operator 530 and extends towards a position corresponding to the actor 510. As such, upon receiving the path indication 526 of the linear path towards the actor 510, the camera operator device 534 displays the virtual indicator 528 as a straight dashed line that starts at a position corresponding to the camera operator 530 and extends towards a position corresponding to the actor 510.

Figure 5C:
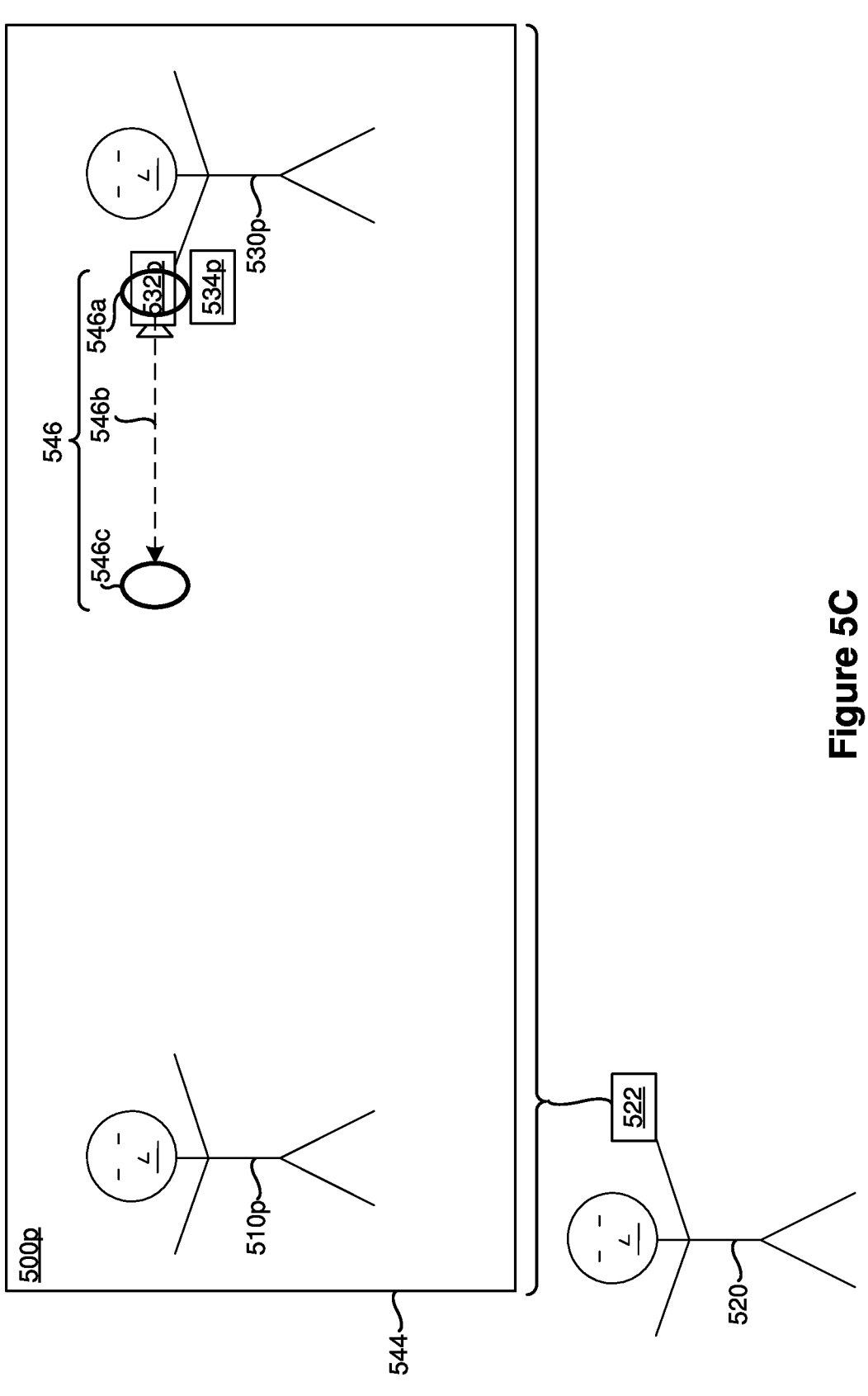

Referring to FIG. 5C, in some implementations, the director device 522 includes a touchscreen display 544 that allows the director 520 to specify a path by drawing the path onto the touchscreen display 544. In the example of FIG. 5C, the touchscreen display 544 displays a pass-through 500p of the operating environment 500. The director device 522 displays the pass-through 500p of the operating environment 500 by displaying two-dimensional (2D) representations of physical objects that are in a field-of-view of a camera of the director device 522. The 2D representations of physical objects may be referred to as pass-through representations of the physical objects. In the example of FIG. 5C, the pass-through 500p of the operating environment 500 includes a pass-through representation 510p of the actor 510, a pass-through representation 530p of the camera operator 530, a pass-through representation 532p of the camera 532 and a pass-through representation 534p of the camera operator device 534.

In the example of FIG. 5C, the director device 522 detects a drag gesture 546 that includes a contact 546a at a location corresponding to the pass-through representation 532b of the camera 532, a drag 546b towards a direction of the pass-through representation 510p of the actor 510 and a lift-off 546c. The drag gesture 546 corresponds to a hand-drawn path that the director 520 has specified. In the example of FIG. 5C, the hand-drawn path is a linear path that extends from a position corresponding to the camera operator 530 to a position correspond to the actor 510. The hand-drawn path of FIG. 5C resembles the linear path of a push shot shown in FIG. 5B. While FIG. 5C illustrates a linear hand-drawn path, other shapes of hand-drawn paths are also contemplated. For example, the director 520 may draw a curved path, an elliptical path, a circular path or a path with any other shape for the camera operator 530 to follow.

Figure 5D:
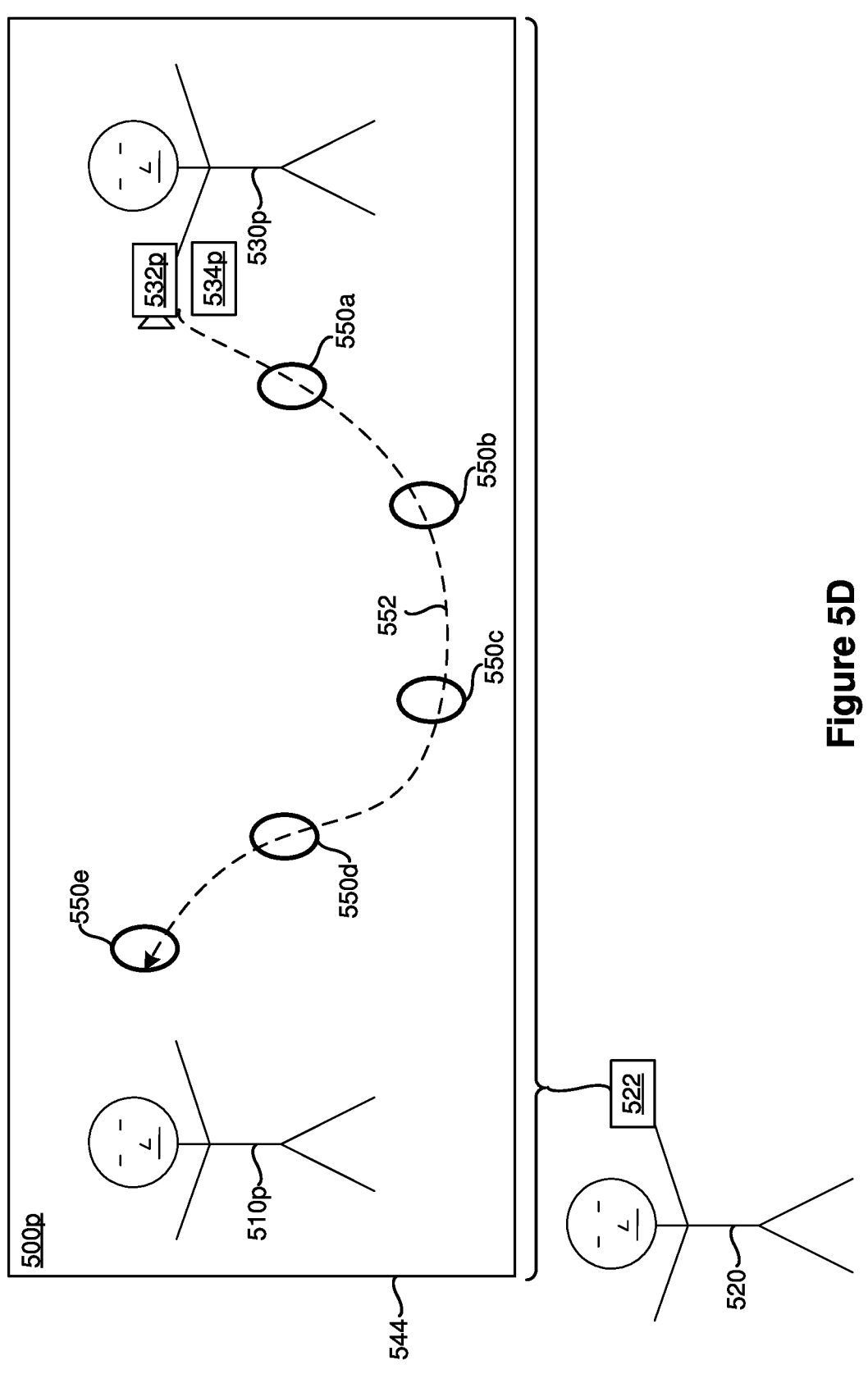

FIG. 5D illustrates the director device 522 generating a continuous path 552 that connects a set of discrete user inputs 550a, 550b, . . . , and 550e specified by the director 520. In the example of FIG. 5D, the director 520 has provided the set of discrete user inputs 550a, 550b, . . . , and 550e to specify physical locations within the operating environment 500 from where the actor 510 is to be filmed. The director 520 can provide the set of discrete user inputs 550a, 550b, . . . , and 550e by tapping on respective locations of the touchscreen display 544 that correspond to the set of discrete user inputs 550a, 550b, . . . , and 550e. In some implementations, the director device 522 generates the continuous path 552 such that movement of the camera 532 between the physical locations corresponding to the set of discrete user inputs 550a, 550b, . . . , and 550e appears to be a smooth motion (e.g., instead of an abrupt or jerky motion). For example, the director device 522 generates the continuous path 552 such that the continuous path 552 does not include sharp 90° turns.

After generating the continuous path 552, the director device 522 provides an indication of the continuous path 552 to the camera operator device 534. For example, the director device 522 transmits information that indicates a shape of the continuous path 552 and dimensions of the continuous path 552. Upon receiving the indication of the continuous path 552, the camera operator device 534 displays a virtual indicator that indicates the continuous path 552. For example, the camera operator device 534 may display a dashed curved line on top of a pass-through of the operating environment 500 to indicate the continuous path 552 to the camera operator 530.

Figure 5E:
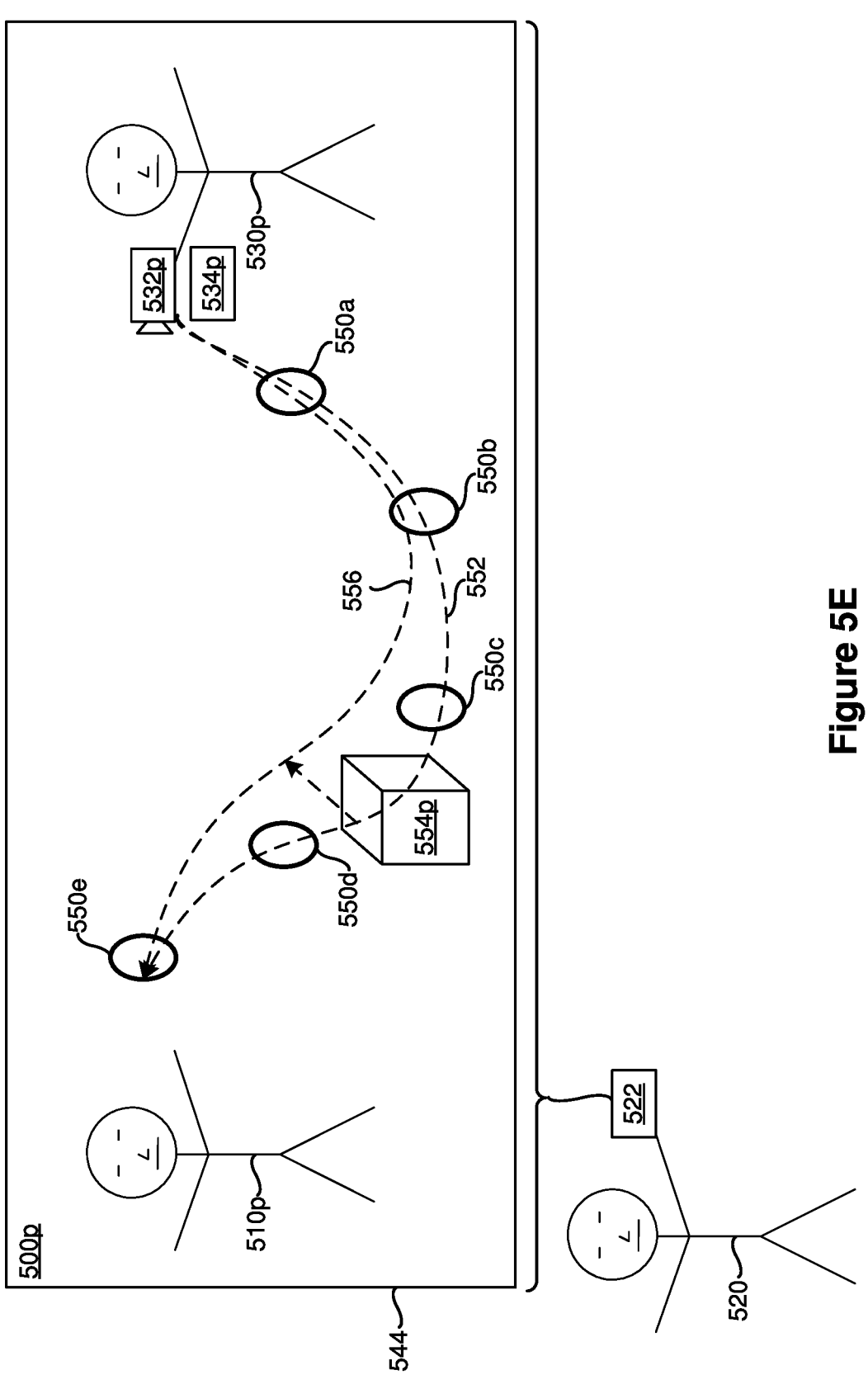

Referring to FIG. 5E, in some implementations, the director device 522 collects environmental data regarding the operating environment 500. The director device 522 utilizes the environmental data to identify locations of physical objects that may serve as obstacles for the camera operator 530 as the camera operator 530 walks along a path specified by the director 520. FIG. 5E illustrates a pass-through representation 554p of a physical object that overlaps with the continuous path 552 generated based on the set of discrete user inputs 550a, 550b, . . . , and 550e. In order to prevent the camera operator 530 from colliding with the physical object corresponding to the pass-through representation 554p shown in FIG. 5E, the director device 522 generates a modified path 556 that does not overlap with the location of the physical object. The director device 522 transmits an indication of the modified path 556 to the camera operator device 534 and the camera operator device 534 displays a virtual indicator of the modified path 556. In some implementations, the director device 522 adjusts a previously generated path based on changes in the operating environment 500. For example, the director device 522 may detect movement of a physical object into the path and adjust the path to avoid the physical object that has moved into the path. The environmental data may include image data captured by an image sensor of the director device 522 and/or depth data captured by a depth sensor of the director device 522.

Figure 5F:
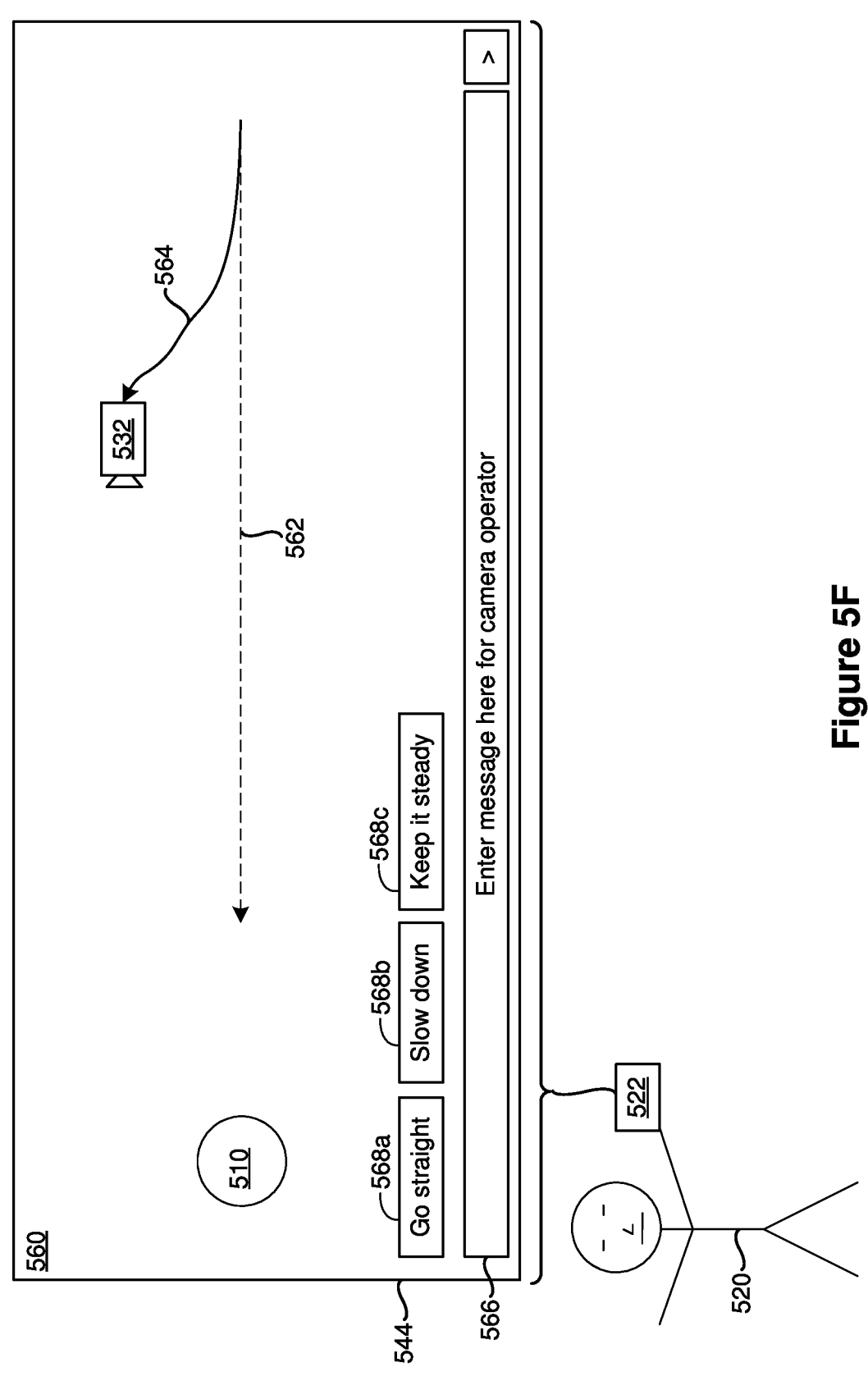

In some implementations, the director device 522 indicates whether an entity is following a path that the director device 522 generated for the entity. In the example of FIG. 5E, the director device 522 may determine whether the camera operator 530 is following the modified path 556 that the director device 522 generated for the camera operator 530 to follow. Referring to FIG. 5F, the director device 522 displays a top view 560 of the operating environment 500. The top view 560 includes a top view of the actor 510 and a top view of the camera 532.

The top view 560 illustrates a generated path 562 for the camera operator 530 to follow as the camera operator 530 moves the camera 532 during the cinematic shot. The top view 560 further illustrates an actual path 564 of the camera 532. As can be seen, the actual path 564 of the camera 532 is different from the generated path 562. The director device 522 displays a message field 566 that the director 520 can utilize to send a message to the camera operator device 534 (not shown). The director 520 may type or dictate the message into the message field 566. As an example, the director 520 may remind the camera operator 530 to stay on the generated path 562.

Additionally or alternatively, the director device 522 can display predefined messages 568a, 568b and/or 568c that the director 520 can send to the camera operator device 534 by selecting (e.g., tapping) one of the predefined messages 568a, 568b and/or 568c. In some implementations, the director device 522 generates the predefined message 568a based on a shape of the generated path 562. For example, since the generated path 562 is straight, the predefined message 568a states "Go straight". As another example, if the generated path 562 was circular, the predefined message 568a may instead state "Circle the actor". In some implementations, the director device 522 generates the predefined message 568b based on a movement of the camera 532 (e.g., based on a speed at which the camera operator 530 is moving the camera 532). For example, if the camera operator 530 is moving faster than a target speed associated with the generated path 562, the predefined message 568b may state "Slow down". By contrast, if the camera operator 530 is moving slower than the target speed associated with the generated path 562, the predefined message 568b may instead state "Speed up". In some implementations, the cinematic shot requires the camera 532 to be held at a particular height or a particular angle throughout the cinematic shot. In such implementations, the director device 522 generates the predefined message 568c based on a variation in the height or the angle of the camera 532 being greater than a tolerance threshold. For example, if the camera operator 530 is moving the camera 532 up and down by greater than the tolerance threshold, the predefined message 568c states "Keep it steady".

Figure 5G:
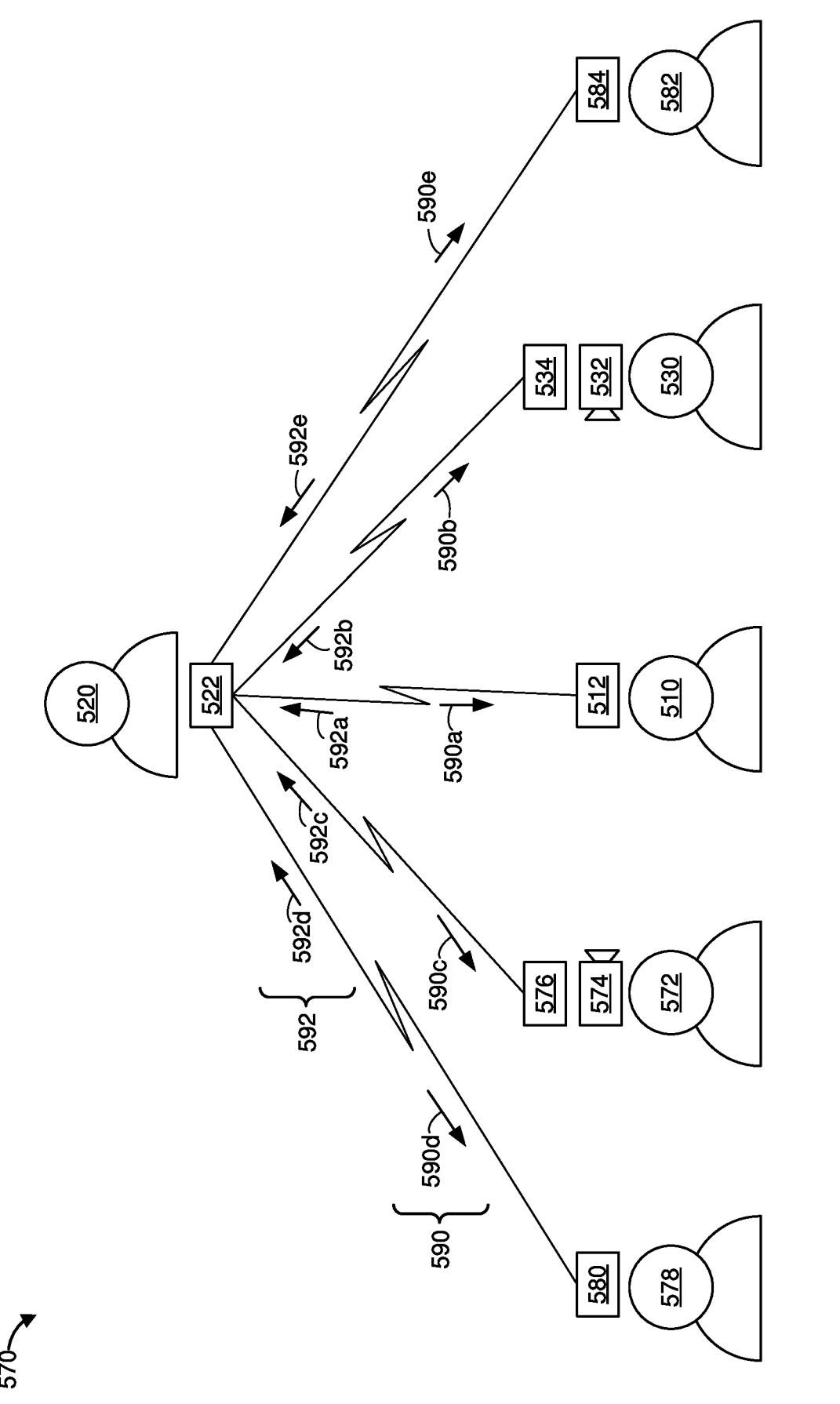

FIG. 5G illustrates a physical environment 570 with various entities that need to move in coordination in order to captured a target cinematic shot. In the example of FIG. 5G, the physical environment 570 includes the actor 510, an actor device 512, the director 520, the director device 522, the camera operator 530, the camera 532, the camera operator device 534, a second camera operator 572, a second camera 574 being operated by the second camera operator 572, a second camera operator device 576 being used by the second camera operator 572, a boom operator 578 that is operating a boom mic (not shown), a boom operator device 580 being used by the boom operator 578, a gaffer 582 operating a light equipment (not shown) and a gaffer device 584 being used by the gaffer 582.

In various implementations, the director device 522 determines respective paths 590 for the actor, the camera operator 530, the second camera operator 572, the boom operator 578 and the gaffer 582 to follow in order to capture the target cinematic shot. For example, the director device 522 determines an actor path 590a for the actor 510 to follow during the cinematic shot. The director device 522 determines a first camera operator path 590b for the camera operator 530 to following during the cinematic shot. The director device 522 determines a second camera operator path 590c for the second camera operator 572 to follow during the cinematic shot. The director device 522 determines a boom operator path 590d for the boom operator to follow during the cinematic shot. The director device 522 determines a gaffer path 590e for the gaffer 582 to follow during the cinematic shot. The director device 522 transmits information regarding the respective paths 590 to the corresponding devices and the corresponding devices display virtual indicators indicative of their respective paths 590. For example, the actor device 512 displays a virtual indicator indicative of the actor path 590a, the camera operator device 534 displays a virtual indicator indicative of the first camera operator path 590b, the second camera operator device 576 displays a virtual indicator indicative of the second camera operator path 590c, the boom operator device 580 displays a virtual indicator indicative of the boom operator path 590d, and the gaffer device 584 displays a virtual indicator indicative of the gaffer path 590e.

In some implementations, the director device 522 determines the respective paths 590 for the entities based on corresponding entity characteristics 592. The director device 522 may receive the entity characteristics 592 from devices associated with the entities. For example, the director device 522 receives an actor characteristic 592a from the actor device 512, a first camera characteristic 592b from the camera operator device 534, a second camera characteristic 592c from the second camera operator device 576, a boom operator characteristic 592d from the boom operator device 580 and a gaffer characteristic 592e from the gaffer device 584.

In some implementations, the entity characteristics 592 define movement characteristics of the corresponding entities. For example, the entity characteristics 592 may specify types of movements that the entities can perform. As an example, the first camera characteristic 592b may specify that the camera 532 can be moved along a straight line (e.g., because the camera 532 is mounted on a linear track) and not along a non-linear path (e.g., not in a circular path because the camera 532 is mounted on the linear track). As another example, the actor characteristic 592a may state a threshold speed that the actor 510 cannot exceed due to the actor's outfit. In various implementations, the director device 522 determines the paths 590 based on the corresponding entity characteristics 592. For example, the director device 522 determines the first camera operator path 590b to be a linear path because the first camera characteristic 592b states that the camera 532 is limited to linear movements. As another example, the director device 522 limits a length of the actor path 590a so that the actor 510 can traverse the actor path 590a within a time period allotted for the target cinematic shot without exceeding a threshold speed indicated by the actor characteristic 592a.

Figure 5H:
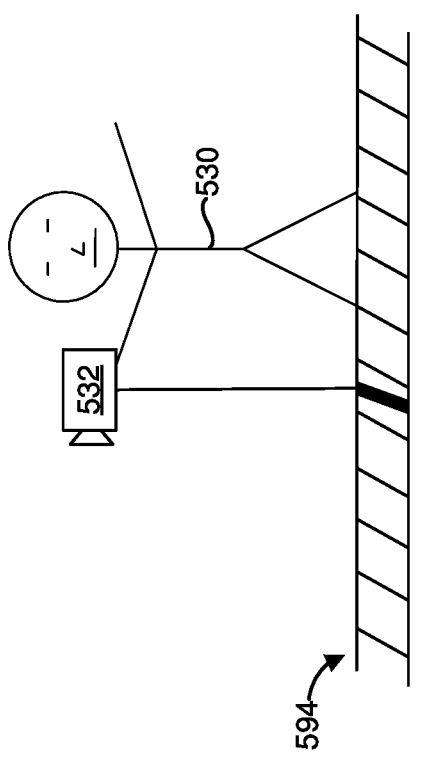
Figure 5H:
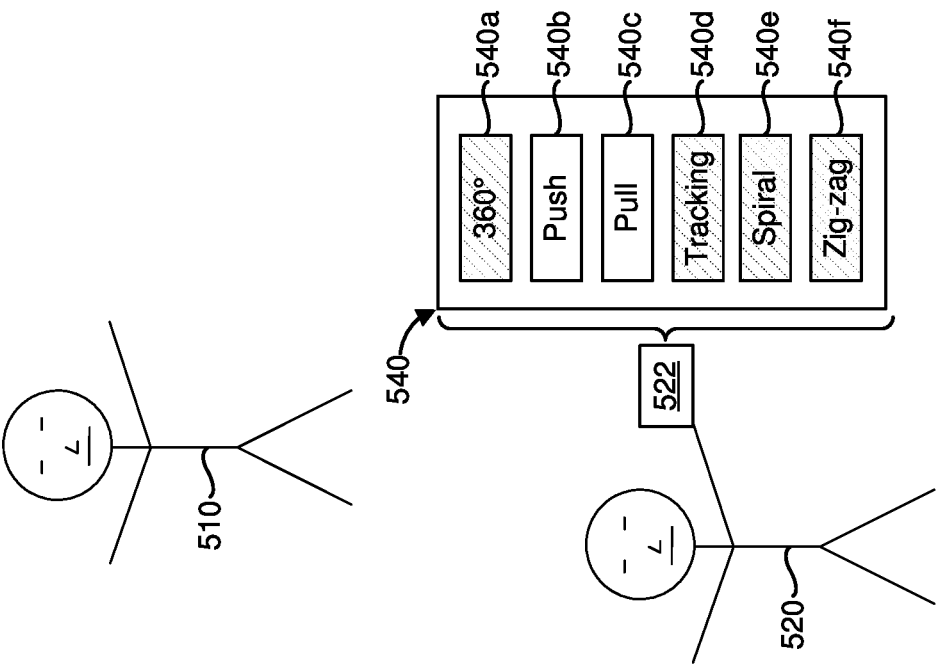

Referring to FIG. 5H, in some implementations, the director device 522 limits selection of cinematic shots based on the entity characteristics 592 shown in FIG. 5G. In the example of FIG. 5H, the camera 532 is mounted on a linear track 594. As such, the camera 532 can only be moved along a linear path and not a non-linear path. For example, the camera 532 cannot be moved along a circular path to perform a 360° shot. Since the camera 532 can only be moved along a linear path, the director device 522 changes the user interface 540 to make cinematic shot affordances that are associated with non-linear paths unselectable. In the example of FIG. 5H, the director device 522 makes the 360 degree shot affordance 540a unselectable (as indicated by the cross-hatching) because the camera 532 cannot be moved along a circular path to capture the 360 degree shot. The director device 522 makes the tracking shot affordance 540c unselectable (as indicated by the cross-hatching) because the orientation of the linear track 594 only allows the camera 532 to be moved towards or away from the actor 510 and not parallel to the actor 510 in order to capture a tracking shot. The director device 522 makes the spiral shot affordance 540e unselectable (as indicated by the cross-hatching) because the camera 532 cannot be moved along a spiral path due to being mounted on the linear track 594. The director device 522 makes the zig-zag shot affordance 540f unselectable (as indicated by the cross-hatching) because camera 532 cannot be moved along a zig-zag path due to being limited to linear movement.

While the discussion relating to FIGS. 5A-5H describes the director device 522 as generating the path for an entity to follow, in some implementations, the director device 522 requests another device to generate the path. For example, the director device 522 may include an HMD that requests a smartphone, a tablet, a laptop computer, a desktop computer, a server or a cloud computing platform to generate the path for the entity. As another example, the director device 522 may include a smartphone, a tablet, a laptop computer or a desktop computer that requests a server or a cloud computing platform to generate the path for the entity. As such, in various implementations, the director device 522 determines the path for an entity by generating the path or by obtaining the path from another device that generates the path.

Figure 6:
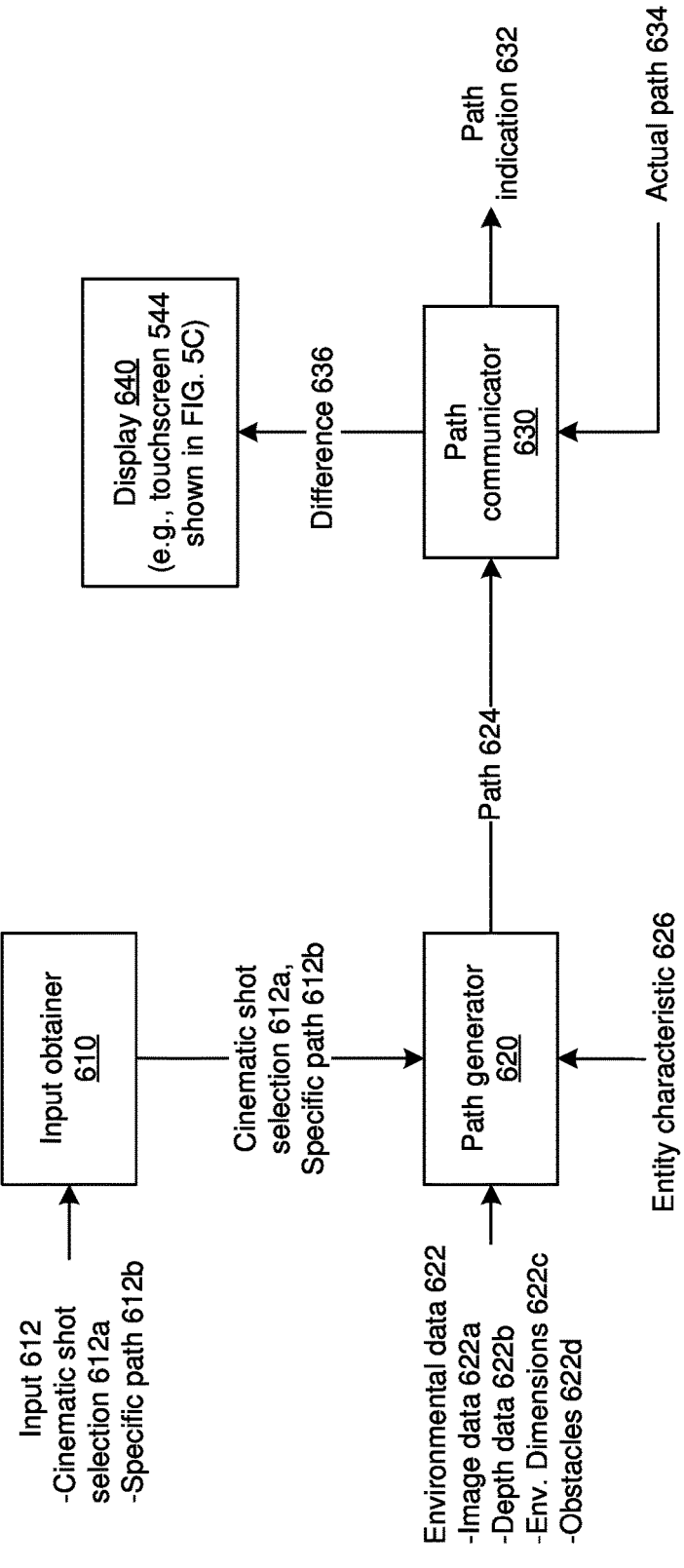
FIG. 6 is a block diagram of a system that generates a path for an entity in accordance with some implementations.

FIG. 6 is a block diagram of a system 600 that generates a path for an entity to follow in order to capture a cinematic shot. In some implementations, the system 600 includes an input obtainer 610, a path generator 620 and a path communicator 630. In various implementations, the system 600 resides at (e.g., is implemented by) the director device 522 shown in FIGS. 5A-5H. In some implementations, the system 600 resides at a server or a cloud computing platform.

In various implementations, the input obtainer 610 obtains an input 612 that corresponds to a request to capture a cinematic shot of a subject (e.g., the actor 510 shown in FIGS. 5A-5B). In some implementations, the input 612 includes a cinematic shot selection 612a that indicates a type of cinematic shot that is to be captured. In some implementations, the input obtainer 610 obtains the input 612 by detecting a user input that is directed to an affordance for a particular type of cinematic shot. For example, referring to FIG. 5B, in some implementations, the input obtainer 610 obtains the input 612 by detecting the user input 542 directed to the push shot affordance 540b. In some implementations, the input obtainer 610 obtains the input 612 by detecting a user input that specifies a specific path 612b for the entity to follow during the cinematic shot. For example, referring to FIG. 5C, in some implementations, the input obtainer 610 obtains the input 612 by detecting the drag gesture 546. In various implementations, the input obtainer 610 provides the cinematic shot selection 612a and/or the specific path 612b to the path generator 620.

In various implementations, the path generator 620 generates a path 624 for the entity to follow in order to capture the cinematic shot indicated by the input 612. In some implementations, the path generator 620 selects the path 624 from a set of paths associated with respective cinematic shots based on the cinematic shot selection 612a. As an example, the path generator 620 may select a straight path extending towards the subject in response to the cinematic shot selection 612a being a push shot. As another example, the path generator 620 may select a straight path extending away from the subject in response to the cinematic shot selection 612a being a pull shot. As yet another example, the path generator 620 may select a circular path that encircles the subject in response to the cinematic shot selection 612a being a 360 degree shot.

In various implementations, the path generator 620 determines a shape and/or a dimension of the path 624 based on environmental data 622 that characterizes a physical environment in which the cinematic shot is to be captured. The environmental data 622 may include image data 622a captured by an image sensor and/or depth data 622b captured by a depth sensor. The environmental data 622 may indicate environmental dimensions 622c (e.g., a size of the physical environment where the cinematic shot is to be captured). In some implementations, the path generator 620 sets a shape and/or a dimension of the path so that the path 624 does not require the entity to exceed a physical boundary of the physical environment indicated by the environmental dimensions 622c. The environmental data 622 may indicate obstacles 622d in the physical environment (e.g., the physical object corresponding to the pass-through representation 554p shown in FIG. 5E). In some implementations, the path generator 620 generates the path 624 so as to avoid the obstacles 622d (e.g., so that the entity does not collide with the obstacles while following the path 624).

In some implementations, the path generator 620 obtains an entity characteristic 626 (e.g., the entity characteristics 592 shown in FIG. 5G) and determines the path 624 based on the entity characteristic 626. In some implementations, the entity characteristic 626 indicates a type of movement that the entity can exhibit and/or a type of movement that the entity cannot exhibit. For example, the entity characteristic 626 may indicate that a particular camera is installed on a circular track and can only move along a circular path and not along a non-circular path (e.g., not along a linear path, a zig-zag path, etc.). In this example, the path generator 620 generates the path 624 to be circular. In some implementations, the entity characteristic 626 indicates a speed at which the entity can move (e.g., a threshold speed that the entity cannot exceed, for example, due to a physical limitation). In such implementations, the path generator 620 sets a dimension and/or a shape of the path 624 such that the entity can traverse (e.g., move along the path 624) within a given time period while traveling at the allowed speed.

In some implementations, the path generator 620 generates the path 624 by modifying the specific path 612b based on the environmental data 622 and/or the entity characteristic 626. In some implementations, the path generator 620 modifies the specific path 612b to avoid the obstacles 622d indicated by the environmental data 622. For example, referring to FIG. 5E, the path generator 620 modifies the continuous path 552 to generate the modified path 556. In some implementations, the path generator 620 modifies the specific path 612b so that the path 624 can be traversed by the entity based on an allowed movement type or an allowed movement speed indicated by the entity characteristic 626. In some implementations, the path generator 620 generates the path 624 by removing a segment of the specific path 612b that the entity cannot traverse based on the environmental data 622 and/or the entity characteristic 626.

Although FIG. 6 illustrates the path generator 620 generating a single path, in some implementations, the path generator 620 generates multiple paths. For example, with reference to FIG. 5G, the path generator 620 may generate the paths 590. More generally, in various implementations, the path generator 620 generates various paths for respective entities to concurrently follow in order to capture a particular cinematic shot.

In various implementations, the path communicator 630 transmits a path indication 632 to a device that is associated with the entity. For example, referring to FIG. 5A, the path communicator 630 may trigger the director device 522 to transmit the path indication 526 to the camera operator device 534. In some implementations, the path indication 632 includes information regarding the path 624. For example, the path indication 632 may indicate a shape of the path 624, a dimension of the path 624, a speed at which the path 624 is to be traversed and/or a time period during which the path 624 is to be traversed. The device associated with the entity receives the path indication 632 and utilizes the information included in the path indication 632 to display a virtual indicator of the path 624 (e.g., the virtual indicator 528 shown in FIG. 5A).

In some implementations, the path communicator 630 obtains information regarding an actual path 634 that the entity is following or has followed during the cinematic shot. The path communicator 630 determines a difference 636 between the path 624 generated for the entity and the actual path 634 that the entity followed. The path communicator 630 displays an indication of the difference 636 on a display 640 (e.g., on the touchscreen display 544 as shown in FIG. 5F). In some implementations, the path communicator 630 detects user inputs that correspond to messages that a user of the system 600 (e.g., the director 520 shown in FIG. 5F) wants to send to the entity in order to guide the entity along the path 624. In such implementations, the path communicator 630 transmits the messages to the device associated with the entity. For example, with reference to FIG. 5F, the path communicator 630 detects a message being typed in the message field 566 and transmits the message to the camera operator device 534 when the director 520 presses a 'Send' button.

Figure 7:
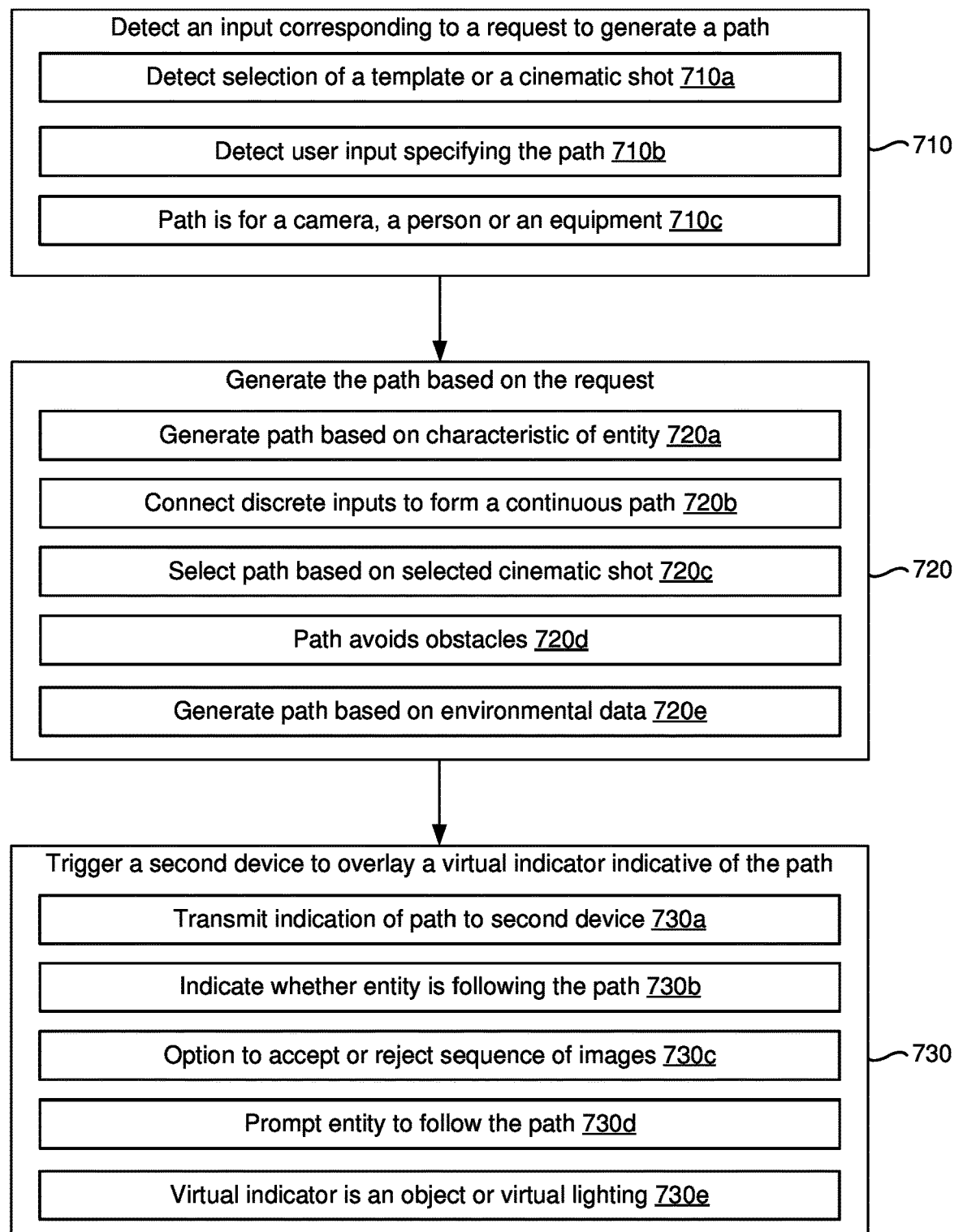
FIG. 7 is a flowchart representation of a method of generating a path for an entity in accordance with some implementations.

FIG. 7 is a flowchart representation of a method 700 for generating a path for an entity. In various implementations, the method 700 is performed by a device including a display, an input device, a non-transitory memory and one or more processors coupled with the display, the input device and the non-transitory memory (e.g., the director device 522 shown in FIGS. 5A-5H and/or the system 200 shown in FIG. 2). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in various implementations, the method 700 includes detecting, via the input device, an input that corresponds to a request to generate a path for an entity to follow while a sequence of images is to be captured. For example, as shown in FIG. 5A, the director device 522 detects the input 524 that corresponds to a request to capture a cinematic shot of the actor 510.

As represented by block 710a, in some implementations, the input includes a selection of a template that is associated with the path. In some implementations, the template is a predefined cinematic shot that is associated with a pre-defined path. For example, as shown in FIG. 5B, the selected template may be a push shot that is associated with a linear path that extends towards a subject that is to be filmed. As another example, the selected template may be a 360 degree shot that is associated with a circular path that encircles the subject that is to be filmed. As illustrated in the example of FIG. 5B, the method 700 may include displaying various templates and detecting a selection of one of the displayed templates.

As represented by block 710b, in some implementations, the input corresponds to a user of the first device drawing the path. In some implementations, the input device includes a touchscreen, and the input is a two-dimensional (2D) gesture detected on the touchscreen. For example, as shown in FIG. 5C, the director 520 performs the drag gesture 546 on the touchscreen display 544 in order to draw a linear path that extends towards the actor 510. In some implementations, the input device includes an image sensor, and the input is a three-dimensional (3D) gesture detected by the image sensor. For example, referring to FIG. 5A, the director 520 may perform a 3D gesture that starts by pointing at the camera 532 and finishes by pointing at the actor 510.

As represented by block 710c, in some implementations, the entity is a second device that includes a camera that is to capture the sequence of images. For example, referring to FIG. 5A, the director device 522 determines the path indicated by the virtual indicator 528 for the camera 532 to be pushed along in order to capture a push shot. In some implementations, the entity is a person. For example, as shown in FIG. 5G, the director device 522 generates the actor path 590a for the actor 510 to follow. In some implementations, the entity is an equipment such as a camera with an actuator that controls motion of the camera.

As represented by block 720, in various implementations, the method 700 includes generating the path for the entity based on the request. For example, as shown in FIG. 5A, the director device 522 generates the path indicated by the virtual indicator 528 for the camera operator 530 based on the input 524. As another example, as shown in FIG. 6, the path generator 620 generates the path 624 for an entity to follow based on the input 612.

As represented by block 720a, in some implementations, the method 700 includes generating the path based on a characteristic of the entity. For example, as shown in FIG. 5G, the director device 522 generates the actor path 590a based on the actor characteristic 592a. In some implemen-tations, the characteristic includes a movement characteristic that characterizes how the entity moves. In some implemen-tations, the movement characteristic indicates that the entity is biased towards linear movement and generating the path includes generating a linear path. For example, as shown in FIG. 5H, the director device 522 limits selection of cin-ematic shots to cinematic shots with linear paths in response to determining that the camera 532 is mounted on the linear track 594 and is only capable of linear movement and not non-linear movements such as along a circular path associ-ated with a 360 degree shot.

In some implementations, the movement characteristic indicates a speed at which the entity can move and gener-ating the path includes setting a dimension of the path such that the entity is able to traverse the path at a specified speed of the entity within a specific time period. For example, referring to FIG. 5G, the director device 522 sets a dimen-sion and/or a shape of the actor path 590a based on a threshold speed that the actor 510 cannot exceed.

As represented by block 720b, in some implementations, detecting the input includes detecting a plurality of user inputs and generating the path includes connecting the plurality of user inputs to form a continuous path. For example, as shown in FIG. 5D, the director device 522 connects the set of discrete user inputs 550a, 550b, . . . , and 550e to form the continuous path 552 for the camera operator 530 to follow.

As represented by block 720c, in some implementations, generating the path includes selecting the path from a plurality of paths and the path is associated with a type of cinematic shot that is to be captured. For example, referring to FIG. 5B, the director device 522 selects a linear path leading to the actor 510 when the director 520 selects the push shot affordance 540b. As another example, the device selects a circular path that surrounds the subject when the device detects a selection of a 360 degree shot.

As represented by block 720d, in some implementations, generating the path includes generating the path such that the path avoids obstacles in the physical environment. For example, as shown in FIG. 5E, the director device 522 generates the modified path 556 in order to prevent the camera operator 530 from walking along the continuous path 552 that intersects with the physical object represented by the pass-through representation 554p of the physical object.

As represented by block 720e, in some implementations, generating the path includes generating the path based on environmental data that was captured while a user of the first device walks along the path. For example, referring to FIG. 5D, instead of providing the set of discrete user inputs 550a, 550b, . . . , and 550e, the director 520 may walk along with continuous path 552 while allowing the director device 522 to record the continuous path 552 and instructing the camera operator 530 to walk along the continuous path 552.

As represented by block 730, in various implementations, the method 700 includes triggering a second device that is associated with the entity to overlay a virtual indicator indicative of the path on a pass-through of a physical environment. In some implementations, the virtual indicator guides the entity along the path while the sequence of images is captured. As represented by block 730a, in some implementations, the method 700 includes transmitting an indication of the path to the second device that is associated with the entity. For example, as shown in FIG. 5A, the director device 522 transmits the path indication 526 to the camera operator device 534 and the camera operator device 534 displays the virtual indicator 528 on top of a pass-through representation of the operating environment 500 so that the camera operator 530 can walk along the path represented by the virtual indicator 528 while capturing images of the actor 510 with the camera 532.

As represented by block 730b, in some implementations, the method 700 includes, while the sequence of images is being captured, indicating, on the display of the first device, whether the entity is moving along the path. For example, as shown in FIG. 5F, the director device 522 indicates whether or not the camera operator 530 is moving the camera 532 along the path generated by the director device 522. In some implementations, indicating whether the entity is moving along the path includes displaying a difference between the path generated for the entity and an actual path that the entity is following. For example, as shown in FIG. 5F, the director device 522 can display the specified path 562 and the actual path 564 to illustrate a divergence of the actual path 564 from the specified path 562. In some implementations, the device computes and displays a numerical value that indicates a difference between the generated path and the actual path of the entity.

As represented by block 730c, in some implementations, the method 700 includes, after the sequence of images is captured, providing an option to accept or reject the sequence of images. For example, referring to FIG. 5H, the director device 522 may display an accept affordance for accepting the sequence of images captured by the camera 532 and a reject affordance for rejecting the sequence of images captured by the camera 532. In some implementations, the device displays the accept affordance and/or the reject affordance when a difference between the generated path and the actual path is greater than an acceptability threshold. In some implementations, the device forgoes displaying the accept affordance and/or the reject affordance when the difference between the generated path and the actual path is less than the acceptability threshold.

As represented by block 730d, in some implementations, the method 700 includes, while the sequence of image is being captured, detecting another input to prompt the entity to follow the path and triggering the second device to display the prompt. For example, as shown in FIG. 5F, the director device 522 may allow the director 520 to communicate with the camera operator 530 by sending one or more of the predefined messages 568a, 568b and/or 568c and/or by sending a customized message.

As represented by block 730e, in some implementations, the virtual indicator displayed on the second device is an augmented reality (AR) object. For example, as shown in FIG. 5A, the virtual indicator 528 is a dotted line along the path indicated by the path indication 526. In some implementations, the virtual indicator displayed on the second device includes virtual lighting that illuminates the path. For example, the virtual indicator may increase a brightness of a portion of the display that overlaps with the path. In some implementations, the virtual indicator displayed on the second device indicates a speed for the entity to move along the path while the sequence of images is captured. For example, the virtual indicator may include an AR object that is moving along the path and the entity has to stay within a threshold distance of the AR object, for example, in order to capture the cinematic shot within a given time period.

Figure 8:
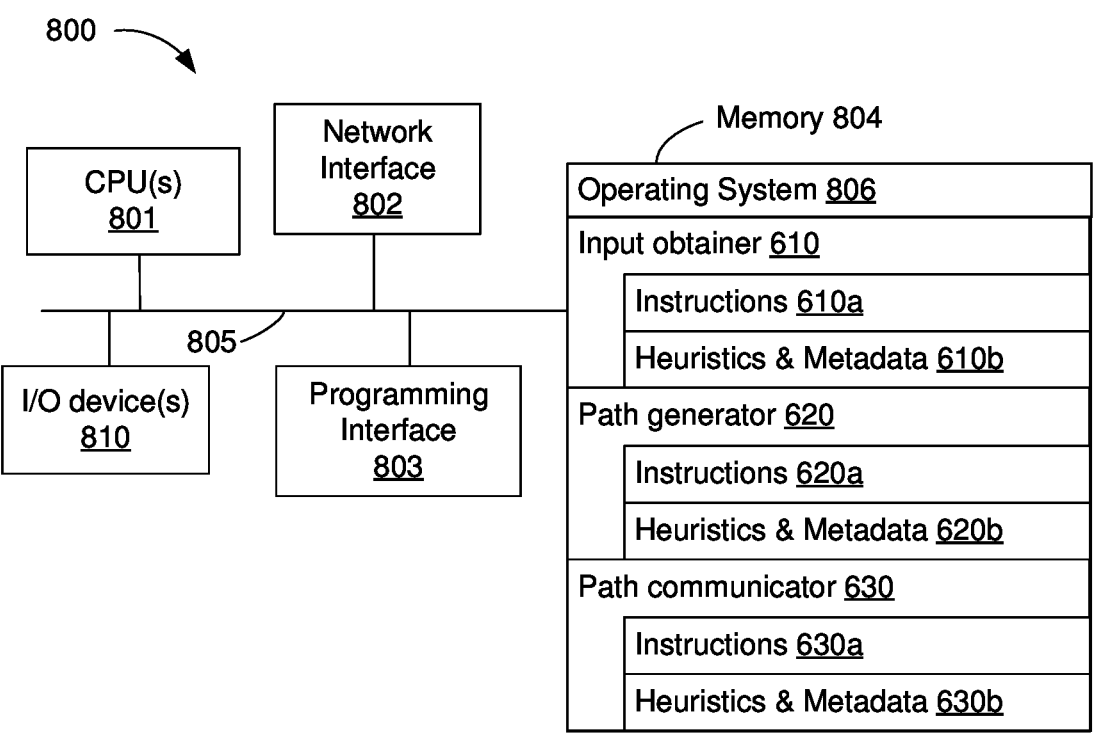
FIG. 8 is a block diagram of a device that generates a path for an entity in accordance with some implementations.

FIG. 8 is a block diagram of a device 800 in accordance with some implementations. In some implementations, the device 800 implements the director device 522 shown in FIGS. 5A-5H and/or the system 600 shown in FIG. 6. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the input obtainer 610, the path generator 620 and the path communicator 630. In various implementations, the device 800 performs the method 700 shown in FIG. 7.

In some implementations, the input obtainer 610 includes instructions 610a, and heuristics and metadata 610b for detecting an input that corresponds to a request to generate a path for an entity to follow while a sequence of images is to be captured (e.g., the input 524 shown in FIG. 5A and/or the input 612 shown in FIG. 6). In some implementations, the input obtainer 610 performs at least some of the operation(s) represented by block 710 in FIG. 7.

In some implementations, the path generator 620 includes instructions 620a, and heuristics and metadata 620b for generating the path for the entity based on the request (e.g., the path indicated by the virtual indicator 528 shown in FIGS. 5A-5B, the continuous path 552 shown in FIG. 5D, the modified path 556 shown in FIG. 5E, the paths 590 shown in FIG. 5G and/or the path 624 shown in FIG. 6). In some implementations, the path generator 620 performs at least some of the operation(s) represented by block 720 in FIG. 7.

In some implementations, the path communicator 630 includes instructions 630a, and heuristics and metadata 630b for triggering a second device that is associated with the entity to overlay a virtual indicator indicative of the path on a pass-through of a physical environment and the virtual indicator guides the entity along the path while the sequence of images is captured (e.g., for transmitting the path indicator 526 shown in FIGS. 5A-5B, information regarding the paths 590 shown in FIG. 5G and/or the path indication 632 shown in FIG. 6). In some implementations, the path communicator 630 performs at least some of the operation(s) represented by block 730 in FIG. 7.

In some implementations, the one or more I/O devices 810 include an input device for detecting an input (e.g., the input 524 detected in FIG. 5A, the user input 542 shown in Figure the gesture 546 shown in FIG. 5C and/or the set of discrete user inputs 550a, 550b, . . . , and 550e shown in FIG. 5D). In some implementations, the input device includes a touchscreen (e.g., the touchscreen device 544 shown in FIGS. 5C-5F for detecting 2D gestures such as taps and drag gestures), an image sensor (e.g., for detecting 3D gesture inputs) and/or a microphone (e.g., for detecting voice inputs). In some implementations, the one or more I/O devices 810 include an environmental sensor for capturing environmental data (e.g., the environmental data 622 shown in FIG. 6). In some implementations, the one or more I/O devices 810 include one or more image sensors (e.g., a visible light camera and/or an infrared (IR) camera for capturing the image data 622a shown in FIG. 6). For example, the one or more I/O devices 810 may include a rear-facing camera of a smartphone or a tablet for capturing images (e.g., a video). As another example, the one or more I/O devices 810 may include a scene-facing camera (e.g., an outward-facing camera) of an HMD for capturing images (e.g., a video). In some implementations, the one or more I/O devices 810 include one or more depth sensors (e.g., a depth camera for capturing the depth data 622*b* shown in FIG. 6). In some implementations, the one or more I/O devices 810 include a display for displaying the virtual indicator of the path generated by the path generator 620 (e.g., for displaying the specified path 562 and the actual path 564 shown in FIG. 5F).

In various implementations, the one or more I/O devices 810 include a video pass-through display which displays at least a portion of a physical environment surrounding the device 800 as an image captured by a camera (e.g., for displaying the pass-through 500*p* of the operating environment 500 shown in FIGS. 5C-5E). In various implementations, the one or more I/O devices 810 include an optical see-through display which is at least partially transparent and passes light emitted by or reflected off the physical environment (e.g., for displaying the pass-through 500*p* of the operating environment 500 shown in FIGS. 5C-5E).

It will be appreciated that FIG. 8 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 8 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Figure 9:
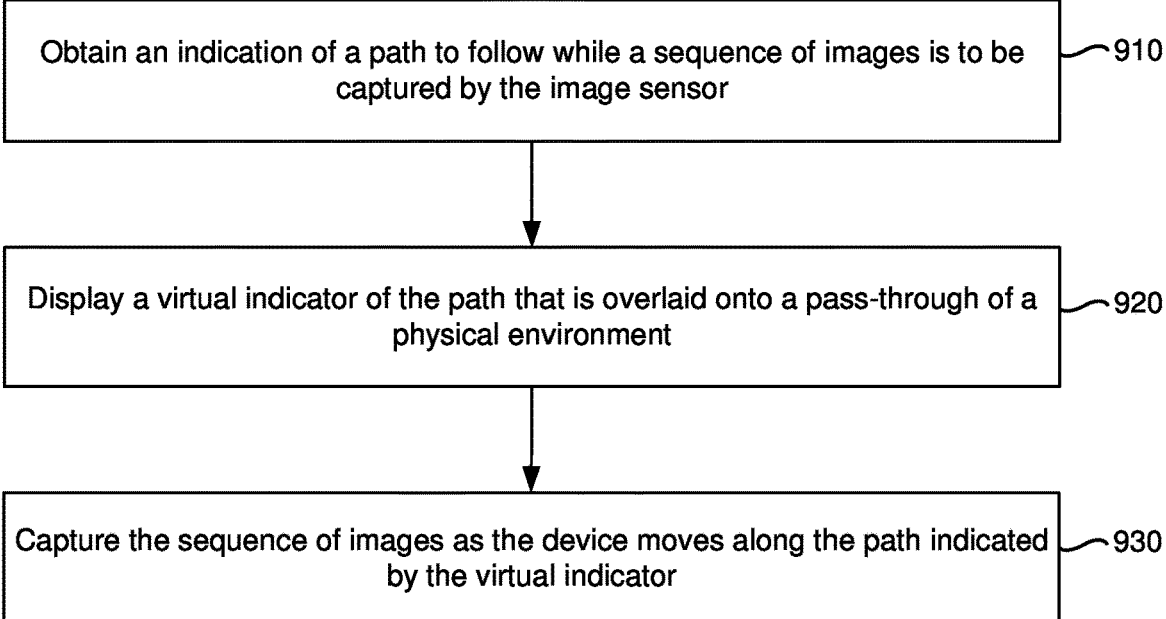
FIG. 9 is a flowchart representation of another method of displaying a virtual indicator for cinematic shots in accordance with some implementations.

FIG. 9 is a flowchart representation of a method 900 for displaying a virtual indicator for cinematic shots. In various implementations, the method 900 is performed by a device including a display, an environmental sensor, a non-transitory memory and one or more processors coupled with the display, the environmental sensor and the non-transitory memory (e.g., the electronic device 10 shown in FIGS. 1A-1O, the system 200 shown in FIG. 2, the camera operator device 534 shown in FIGS. 5A-5B, the actor device 512 shown in FIG. 5G, the second camera operator device 576 shown in FIG. 5G, the boom operator device 580 shown in FIG. 5G and/or the gaffer device 584 shown in FIG. 5G). In some implementations, the method 900 is performed by processing logic, including hardware, firmware, software, or a combination thereof. In some implementations, the method 900 is performed by a processor executing code stored in a non-transitory computer-readable medium (e.g., a memory).

As represented by block 910, in various implementations, the method 900 includes obtaining an indication of a path for the device to follow while a sequence of images is to be captured by the image sensor. In some implementations, obtaining the indication of the path includes receiving the indication from another device that generated the path. For example, as shown in FIG. 5A, the camera operator device 534 receives the path indication 526 from the director device 522. In some implementations, the method 900 includes receiving the indication of the path from a server or a cloud computing device. In some implementations, the method 900 includes retrieving the indication of the path from a non-transitory memory (e.g., from a memory of the device or from a memory of a remote device).

As represented by block 920, in various implementations, the method 900 includes displaying, on the display, a virtual indicator of the path that is overlaid onto a pass-through of a physical environment of the device. For example, as discussed in relation to FIG. 5A, the camera operator device 534 displays the virtual indicator 528 by overlaying the virtual indicator 528 onto a pass-through representation of the operating environment 500. As another example, as shown in FIG. 1F, the electronic device 10 displays the arrows 92 that form the circular path 90 shown in FIG. 1E.

As represented by block 930, in various implementations, the method 900 includes capturing, via the image sensor, the sequence of images as the device moves along the path indicated by the virtual indicator. For example, as shown in FIGS. 1E and 1F, the electronic device 10 is recording a video as the electronic device 10 is being moved along the circular path indicated by the arrows 92. In some implementations, while the sequence of images is being captured, the method 900 includes displaying, on the display, a prompt to stay on the path indicated by the virtual indicator in response to detecting that the device is moving away from the path. For example, as shown in FIG. 1G, the electronic device 10 may display the text 94 while the electronic device 10 is capturing the images in order to improve a quality of the images that are being captured.

In some implementations, the method 900 includes detecting an input that corresponds to proposing a modification to the path, sending a proposed modification of the path to another device that generated the path, modifying the virtual indicator to represent a modified path in response to obtaining an indication that the proposed modification has been accepted, and forgoing modification to the virtual indicator in response to the proposed modification not being accepted. As an example, referring to FIG. 5A, the camera operator device 534 may propose a modification to the path generated by the director device 522. In this example, if the director device 522 accepts the modification proposed by the camera operator device 534, the camera operator device 534 displays a virtual indicator that indicates a modified path instead of the path generated by the director device 522.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a first device including a display, an input device, a non-transitory memory and one or more processors coupled with the display, the input device and the non-transitory memory:

detecting, via the input device, an input that corresponds to a request to generate a path for an entity to follow while a sequence of images is to be captured, wherein the path includes a plurality of locations in a physical environment;

generating the path for the entity based on the request; and transmitting information regarding the path to a second device that is associated with the entity to trigger the second device to overlay a virtual indicator on a pass-through of a physical environment at the plurality of locations in the physical environment, wherein the virtual indicator guides the entity along the path through the plurality of locations in the physical environment while the sequence of images is captured.

2. The method of claim 1, wherein the input includes a selection of a template that is associated with the path.

3. The method of claim 1, wherein the input corresponds to a user of the first device drawing the path to indicate the plurality of locations in the physical environment.

4. The method of claim 1, wherein the input device includes a touchscreen, and wherein the input is a two-dimensional (2D) gesture detected on the touchscreen.

5. The method of claim 1, wherein the input device includes an image sensor, and wherein the input is a three-dimensional (3D) gesture detected by the image sensor.

6. The method of claim 1, wherein the entity is a second device that includes a camera that is to capture the sequence of images.

7. The method of claim 1, wherein the entity is a person.

8. The method of claim 1, wherein the entity is an equipment.

9. The method of claim 1, wherein detecting the input comprises:

displaying, on the display, types of cinematic shots that can be captured; and detecting a selection of one of the cinematic shots.

10. The method of claim 1, wherein generating the path comprises generating the path based on a characteristic of the entity.

11. The method of claim 10, wherein the characteristic includes a movement characteristic that characterizes how the entity moves.

12. The method of claim 11, wherein the movement characteristic indicates that the entity is biased towards linear movement and generating the path includes generating a linear path.

13. The method of claim 11, wherein the movement characteristic indicates a speed at which the entity moves and generating the path includes setting a dimension of the path such that the entity is able to traverse the path within a specific time period.

14. The method of claim 1, wherein detecting the input comprises detecting a plurality of user inputs respectively indicating the plurality of locations in the physical environment and wherein generating the path comprises connecting the plurality of locations in the physical environment to form a continuous path.

15. The method of claim 1, wherein detecting the input comprises detecting selection of the path from a plurality of paths.

16. The method of claim 1, wherein generating the path comprises generating the path such that the path avoids obstacles in the physical environment.

17. The method of claim 1, wherein generating the path comprises generating the path based on environmental data that was captured while a user of the first device walks along the path.

18. A first device comprising:

one or more processors;

an input device;

a display;

a non-transitory memory; and one or more programs stored in the non-transitory memory, which, when executed by the one or more processors, cause the first device to:

detect, via the input device, an input that corresponds to a request to generate a path for an entity to follow while a sequence of images is to be captured, wherein the path includes a plurality of locations in a physical environment;

generate the path for the entity based on the request; and transmitting information regarding the path to a second device that is associated with the entity to trigger the second device to overlay a virtual indicator on a pass-through of a physical environment at the plurality of locations in the physical environment, wherein the virtual indicator guides the entity along the path through the plurality of locations in the physical environment while the sequence of images is captured.

19. A non-transitory memory storing one or more programs, which, when executed by one or more processors of a first device including a display and an input device, cause the first device to:

detect, via the input device, an input that corresponds to a request to generate a path for an entity to follow while a sequence of images is to be captured, wherein the path includes a plurality of locations in a physical environment;

generate the path for the entity based on the request; and transmit information regarding the path to a second device that is associated with the entity to trigger the second device to overlay a virtual indicator on a pass-through of a physical environment at the plurality of locations in the physical environment, wherein the virtual indicator guides the entity along the path through the plurality of locations in the physical environment while the sequence of images is captured.

* * * * *